(12) United States Patent
Skapski et al.

(10) Patent No.: US 12,386,731 B2
(45) Date of Patent: Aug. 12, 2025

(54) AUTOMATED FRAMEWORK FOR TROUBLESHOOTING IN A MESH Wi-Fi NETWORK

(71) Applicant: Plume Design, Inc., Palo Alto, CA (US)

(72) Inventors: Tomasz Skapski, Wroclaw (PL); Kamil Wartanowicz, Wroclaw (PL); Marcin Kalinski, Wroclaw (PL); Ziga Seilnacht, Ljubljana (SI); Mikolaj Habelski, Wroclaw (PL)

(73) Assignee: PLUME DESIGN, INC., Palo Alto, CA (US)

( * ) Notice: Subject to any disclaimer, the term of this patent is extended or adjusted under 35 U.S.C. 154(b) by 297 days.

(21) Appl. No.: 18/113,434

(22) Filed: Feb. 23, 2023

(65) Prior Publication Data

US 2024/0211386 A1    Jun. 27, 2024

Related U.S. Application Data

(63) Continuation-in-part of application No. 18/145,974, filed on Dec. 23, 2022.

(51) Int. Cl.
*G06F 9/445*    (2018.01)
*G06F 9/455*    (2018.01)
(Continued)

(52) U.S. Cl.
CPC ...... *G06F 11/3692* (2013.01); *G06F 11/3688* (2013.01)

(58) Field of Classification Search
CPC ............. G06F 11/3692; G06F 11/3688; G06F 11/0736; G06F 11/0793; G06F 11/0709; G06F 11/0751; G06F 8/65; G06F 11/0772; G06F 11/3698; G06F 11/3684; G06F 11/263; G06F 11/079; G06F 30/20; G06F 30/398; G06F 30/3323; G06F 30/331; H04L 67/02; H04L 67/125; H04L 41/0816; H04L 41/145; H04L 43/0876; H04L 43/045; H04L 41/14; H04L 41/5009; H04L 43/028; H04L 41/0253; H04L 41/22;
(Continued)

(56) References Cited

U.S. PATENT DOCUMENTS 9,760,663 B2 *   9/2017  Lu .......................... G06F 30/398
10,169,495 B2 *  1/2019  Purandare ........... G06F 30/3323
(Continued)

*Primary Examiner* — Thuy Dao
(74) *Attorney, Agent, or Firm* — Nicholas Martin; Greenberg Traurig, LLP

(57) ABSTRACT

Systems and methods are provided for testing both hardware components and software components associated with a local Wi-Fi network during a single test run. An automated test framework, which may be implemented in a cloud-based controller, can be configured, for example, to automatically test components of a cloud-based mesh Wi-Fi network and/or multi-layered hardware/software platform. According to one implementation, a method may include a step of obtaining log data associated with one or more hardware components and one or more software components of a Wi-Fi network. The method may also include the step of analyzing the log data during a single test run to verify whether each hardware component and each software component is operating adequately.

16 Claims, 18 Drawing Sheets

(51) Int. Cl.
*G06F 11/00* (2006.01)
*G06F 11/34* (2006.01)
*G06F 11/36* (2025.01)
*G06F 11/3668* (2025.01)
*G06F 15/173* (2006.01)

(58) Field of Classification Search
CPC ...... H04L 41/147; H04L 67/10; H04W 24/08; H04W 24/02
See application file for complete search history.

(56) References Cited

U.S. PATENT DOCUMENTS

| | | | |
|---|---|---|---|
| 2014/0235179 A1* | 8/2014 | George | H04W 24/08 455/67.14 |
| 2017/0017566 A1* | 1/2017 | Lundstrom | G06F 11/3688 |
| 2019/0026217 A1* | 1/2019 | Yim | G06F 8/00 |
| 2019/0266127 A1* | 8/2019 | Pickard | G06F 16/113 |
| 2020/0404389 A1* | 12/2020 | Cheng | H04N 21/43637 |
| 2021/0195443 A1* | 6/2021 | Agarwal | H04L 41/145 |
| 2022/0377582 A1* | 11/2022 | Sakamoto | H04W 24/02 |

\* cited by examiner

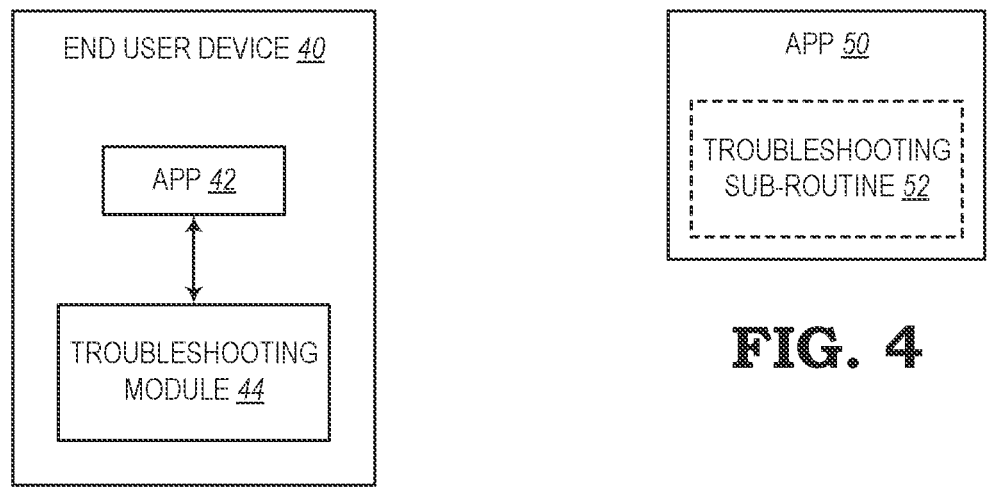
FIG. 3
FIG. 4
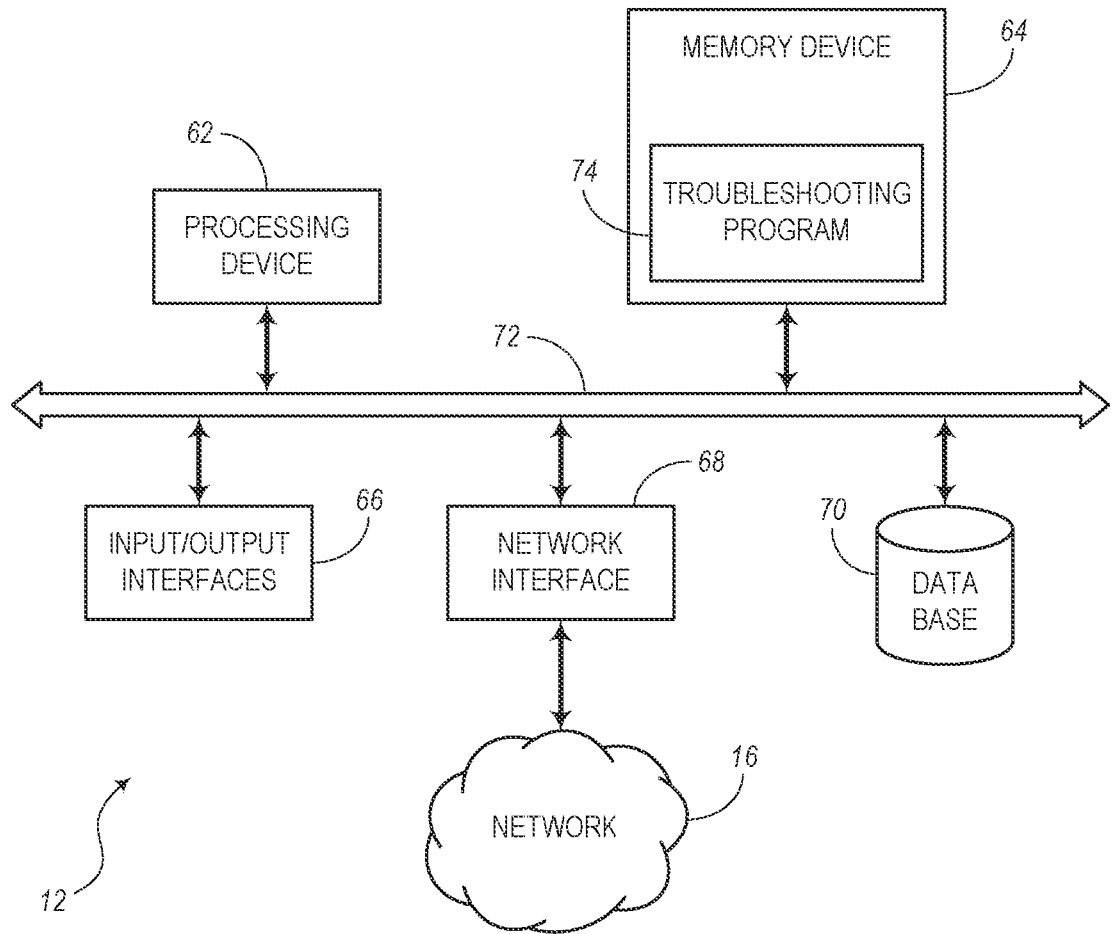
FIG. 5

AUTOMATED FRAMEWORK FOR TROUBLESHOOTING IN A MESH Wi-Fi NETWORK

CROSS-REFERENCE TO RELATED APPLICATION

The present application is a continuation-in-part of application Ser. No. 18/145,974, filed Dec. 23, 2022, entitled "Recording screenshots and user actions for troubleshooting operations of an app," the contents of which are incorporated by reference herein.

FIELD OF THE DISCLOSURE

The present disclosure generally relates to troubleshooting systems and methods. More particularly, the present disclosure relates to systems and methods for recording screenshots and user actions to allow a tester to troubleshoot the operations of an application running on an end user device, as well as evidence of test scenario execution.

BACKGROUND OF THE DISCLOSURE

In the development of computer software, it is often desirable to monitor the usage of an application during a trial period to determine if the application runs according to its intended design. Many conventional troubleshooting systems and methods utilize Command Line Interfaces (CLIs) and other means for providing feedback to a troubleshooter. However, conventional systems normally amass large amounts of data, which can be cumbersome and may strain database storage resources. Also, sorting through large amounts of feedback data can be complex and time-consuming for the troubleshooter. Therefore, there is a need in the field of software troubleshooting systems and methods to provide information to convey the operations of an application in a manner that is relatively easy to follow and does not consume large amounts of storage resources.

BRIEF SUMMARY OF THE DISCLOSURE

The present disclosure relates to systems and methods for recording, in a simplified manner, relevant screenshots of a User Interface (UI) display during use of an application (app). Once the screenshots are stored, along with other metadata, a troubleshooting process may be run to allow a troubleshooter to recreate the sequence of events that occurred during the use of the app on an end user device. This analysis may be simplified by the systems and methods of the present application to enable troubleshooting and debugging of the app.

A method, according to one implementation, includes a step of detecting a plurality of user input actions performed during use of an app. The method also includes capturing a sequence of screenshots representing images displayed by a User Interface (UI) during the use of the app. Each screenshot represents an image displayed by the UI at a specific point in time ranging from immediately before a relevant user input action is performed to immediately after the relevant user input action is performed. Also, the method includes the step of creating a header associated with each screenshot. Each header includes information associated with a respective user input action and/or information associated with a change in the image displayed by the UI during use of the app in response to a respective user input action being performed. Then, the method includes the step of storing the sequence of screenshots and headers in a single image file.

In some embodiments, the method may also include the steps of a) opening the single image file in response to a troubleshooting request, and b) receiving instructions from a troubleshooter to scroll through the sequence of screenshots and headers. For example, the step of storing the sequence of screenshots and headers may include the step of storing the screenshots and headers in a vertical column to enable vertical scrolling. Of note, an aspect of the present disclosure includes the fact that the screenshots are vertically merged.

According to some embodiments, the method may include the step of adding a highlighting feature to each of one or more screenshots. Each highlighting feature, for example, may represent a respective user input action being performed. Also, each highlighting feature may be a colored outline (e.g., red box) around a selected button or field related to the respective user input action.

Each header may include a timestamp defining a date and time when a respective screenshot was displayed by the UI during the use of the app. Also, the single image file may be a jpg file in which image data is compressed. In some embodiments, one or more of the user input actions may be entry actions associated with typing alphanumeric characters in a text field. For each of the entry actions, the method may include capturing a screenshot immediately before a user submits the typed alphanumeric characters, clicks on an enter button, or other action ending the typing event for this particular user action.

In some embodiments, the app may be a mobile app running on a mobile device. Also, the method may be executed by the mobile device itself or may be performed by a remote device in communication with the mobile device. In other embodiments, the app may run on a computer, laptop, tablet, or other similar computing device. Again, the method in this case may be executed by the computing device itself or by a remote device in communication with the computing device. The user input actions, for example, may include a) keystrokes, b) text entry, c) virtual button presses, d) mouse clicks, e) keypad entries, f) option selections, g) screen manipulation commands, and/or other types of user actions associated with use of the app.

Some of user input actions may include button press actions. In response to each button press action, the method may also include capturing a first screenshot immediately before the button press action and adding a highlighting feature to the first screenshot to highlight the button being pressed by the user. it is expected that the next action that triggers UI change will result in another screenshot. For example, the screenshot is captured before a button click and then the next screenshot is captured with the following element interaction, so the second screenshot will have both, the aftermath of the first action and a second interaction. It is done in this fashion to reduce the number of screenshots. Most likely the second screenshot will capture what happened after the initial click. In case of a test failure or unexpected app behavior one additional screenshot is captured at the very end of a test execution.

Furthermore, according to additional embodiments, a method for testing hardware (HW), software (SW), and/or firmware (FW) components in a mesh Wi-Fi system are provided. The method may be performed by a cloud-based server, cloud controller, testing system, etc. Also, the method may be related to the troubleshooting program described above.

The method includes the step of obtaining log data associated with one or more hardware components and one or more software components of a Wi-Fi network. Also, the method includes the step of analyzing the log data during a single test run to verify whether each hardware component and each software component is operating adequately.

In some embodiments, the method may further include the step of utilizing an automated test framework to automatically test the one or more hardware components and one or more software components. For example, the automated test framework may utilize one testing library, one set of reusable test parameters, and/or one testbed in order to test each of the one or more hardware components and one or more software components in a modular fashion and/or in a manner that includes testing one component at a time. The method may be executed by any type of testing system, which may be deployed in a cloud-based controller. The Wi-Fi network, for example, may be a mesh network having a multi-layer hardware/software platform.

Furthermore, with respect to the method, each of the one or more hardware components may be configured to operate according to OpenSync and may also be a router, a modem, a gateway device, a node, an extender, an access point device, a pod, a leaf device, or a client device. Also, each of the one or more software components may be a mobile app, a web app, or other type of app. The step of obtaining the log data may include the step of remotely accessing the log data using a logpull procedure. The method may also include the step of testing a proposed software/firmware release during the single test run. The step of testing the proposed software/firmware release, for example, may include using a real-world Wi-Fi environment and/or simulated Wi-Fi environment.

The single test run described in block may include end-to-end analysis of the Wi-Fi network to test multiple hardware components, one or more communication links between adjacent pairs of hardware components, and the one or more software components in order to verify whether each hardware component, communication link, and software component is operating adequately. In some embodiments, the method may also include the step of utilizing a test script to validate whether each hardware component and software component is performing Wi-Fi transactions in a proper manner. In response to detecting and identifying one or more deficiencies in the Wi-Fi network, the method may further include the step of gathering screenshots associated with a web management interface. In addition, the method may include testing a) Internet connectivity, b) data traffic congestion, c) channel interference, and/or d) wireless signal strength.

According to some embodiments, the method may utilize an automated test framework having tools to perform steps of a) setting test variables, b) communicating with a testbed via SSH interfaces, c) communicating with cloud controller via REST API, d) communicating with a testbed server, testing system, or web management interface, e) configuring a mobile device, f) enabling communication between test script and DUTs, g) communicating with a Remote Managed Power Distribution Unit, h) obtaining http traffic logs between the Wi-Fi network and the Internet, i) obtaining application driver logs, j) obtaining screenshots associated with usage of the one or more software components, k) communicating with a testbed switch, l) reserving a testbed for a specific test run or Continuous Integration (CI) system, m) generating or downloading log files, and/or n) performing an analysis of the log files. Also, the method may include the steps of executing parallel testing and then dynamically assigning testbeds based on the unique capability of each testbed and based on load balancing criteria.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram illustrating a troubleshooting module operating on an end user device, according to various embodiments.

FIG. 4 is a block diagram illustrating a troubleshooting sub-routine incorporated in an application running on an end user device, according to various embodiments.

FIG. 5 is a block diagram illustrating the cloud-based server shown in FIGS. 1 and 2, according to various embodiments.

DETAILED DESCRIPTION OF THE DISCLOSURE

The present disclosure relates to systems and methods for troubleshooting or debugging a computer program or app. According to some embodiments, a sequence of screenshots of a User Interface (UI) is recorded. However, instead of recording a real-time video that might include essentially every single action during the use of an app, the systems and methods of the present disclosure are configured to minimize the number of screenshots captured by storing only certain screen displays when specific user input actions are detected. For example, instead of recording every single keystroke (including backspace events) when a user is entering text into an input field, the present systems are configured to simply record a screenshot of the entered text field immediately before the user presses an "enter" button or other similar confirmation button.

Thus, the systems and methods described herein are able to save a sequence of screenshots displayed by the UI during use of the app. The sequence can be stored in a single image file, which can then be reviewed by a troubleshooter to be able to walk through the progression of the user steps and actions. The sequence can be ordered as the screenshots are capture in a real time sequence. When the single file is opened, the reviewer can scroll through the images as needed. In case the maximum image size is exceeded then the image is sliced into smaller portions, as the complete record can be successfully stored.

Also, the systems and methods are configured to insert headers in between the screenshots. Each header may include a timestamp as well as a description of a user action or a resulting screen that is displayed in response to the user action. In addition, highlighting features can be added to show which buttons a user had pressed during use of the app, user selections of multiple options (e.g., pressing one of multiple selectable buttons or tabs), text entry fields, etc. If the final text of the header exceeds the defined number of lines, screenshot size is not changed, and the new lines are written on top of it with a semi-translucent background.

Figure 1:
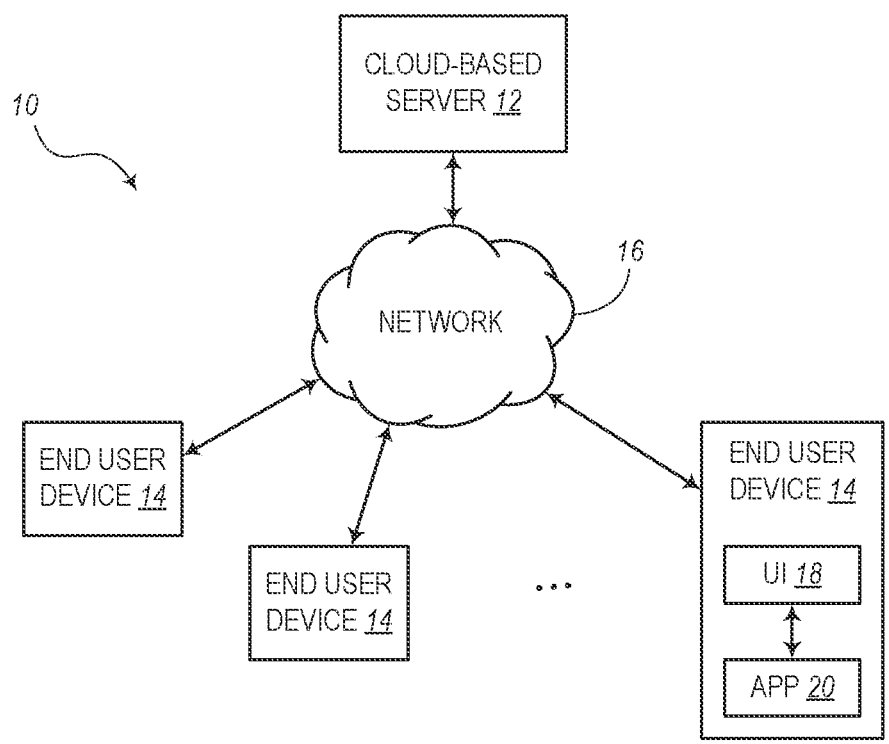
FIG. 1 is a block diagram illustrating a communications system, according to various embodiments.

FIG. 1 is a block diagram illustrating an embodiment of a communications system 10. As shown in FIG. 1, the communications system 10 includes a cloud-based server 12 and a plurality of end user devices 14 configured to communicate over a network 16 (e.g., the Internet). The cloud-based server 12 may be any suitable type of control device, monitoring device, network operator device, Operations, Administration, and Monitoring (OAM) system, etc. According to various embodiments, the cloud-based server 12 may be configured to enable a technique or troubleshooter to monitor the activities of one or more applications (apps) running on the end user devices 14.

In particular, each end user device 14 being monitored by the cloud-based server 12 may be a mobile device (e.g., smart phone), laptop, personal computer, tablet device, etc. Each end user device 14 may include at least a User Interface (UI) 18 (e.g., a Graphical User Interface (GUI) or the like) and one or more apps 20. During use of the app 20 or apps, the UI 18 is configured to display certain information for allowing the user to interact as needed. For example, the app 20 may be configured to display pages, images, virtual buttons, text field boxes, etc. on the UI 18. The user may use any suitable type of selection mechanism (e.g., mouse) and/or technique (e.g., finger-tap action, etc.) for clicking buttons, selecting options, entering text, alphanumeric characters, etc. In response to the user input, the app 20 is configured to perform certain functions.

Figure 2:
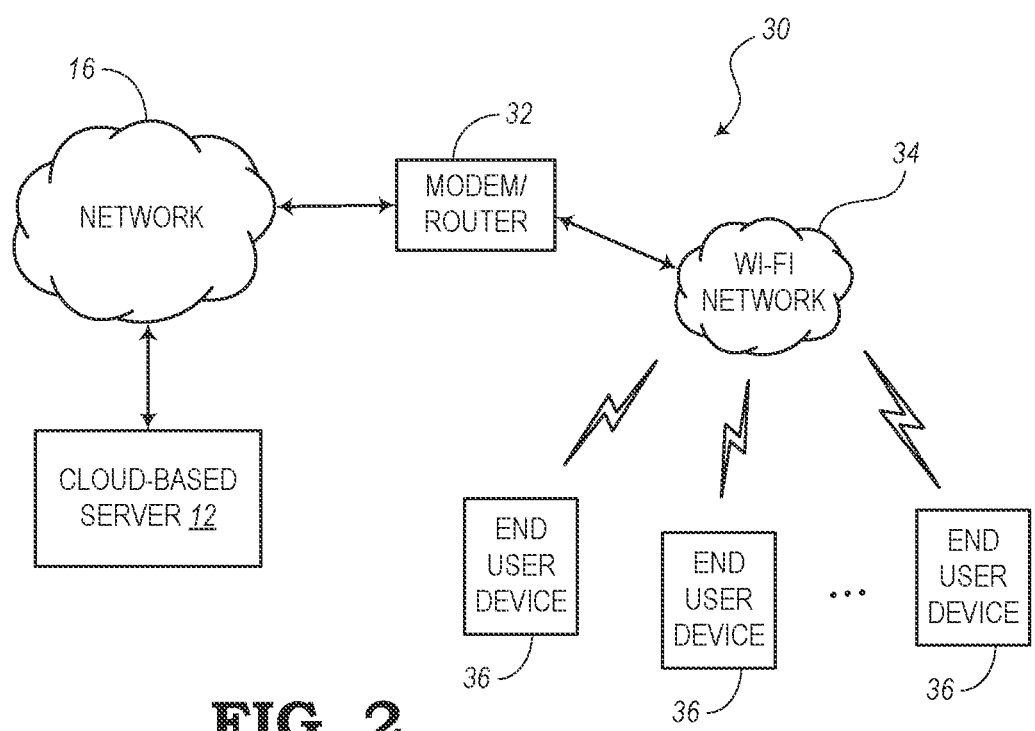
FIG. 2 is a block diagram illustrating another communications system, according to various embodiments.

FIG. 2 is a block diagram illustrating an embodiment of another communications system 30. As illustrated, the communications system 30 includes the cloud-based server 12 and network 16, as is also shown in FIG. 1. In addition, the communications system 30 includes one or more modems/routers 32 that are configured to create one or more local networks. The modem-router 32 (e.g., gateway device) may be configured to connect a Wi-Fi network 34 to the network 16 to allow one or more end user devices 36 to access the network 16. The end user devices 36 may be similar to the end user devices 14 shown in FIG. 1 and may each include a UI and one or more apps. The end user devices 36 may be wired or wireless devices for accessing the network 16 via the modem/router 32.

FIG. 3 is a block diagram illustrating an embodiment of an end user device 40, which may represent one of the end user devices 14, 36 shown in FIGS. 1 and 2. The end user device 40 includes one or more apps 42 and a troubleshooting module 44. The troubleshooting module 44 may include troubleshooting functionality for monitoring the activities of one or more of the apps 42. Also, in some embodiments, information regarding the monitored activities may be stored in the end user device 40 itself and/or may be communicated to the cloud-based server 12. In this respect, the troubleshooting module 44 may be part of a larger system for monitoring and troubleshooting the operations with respect to the app 42. The operations may include user input, selections, etc. as well as the response by the app 42 to the user input and selections.

FIG. 4 is a block diagram illustrating an application (app) 50 running on an end user devices (e.g., end user device 14, 36, 40). In this embodiment, the app 50 includes a troubleshooting sub-routine 52 incorporated in the app 50. The troubleshooting sub-routine 52 may be the same as or similar to the troubleshooting module 44 shown in FIG. 3. In FIG. 3, the troubleshooting module 44 may be separate from the app 42 (or apps) being monitored, whereas the troubleshooting sub-routine 52 shown in FIG. 4 may be incorporated within the code of the app 50.

The troubleshooting module 44 and/or troubleshooting sub-routine 52 may be configured to monitor the activities with respect to the running of the app 42 or app 50. For example, the troubleshooting module 44 and/or troubleshooting sub-routine 52 may be configured to capture screenshots of a corresponding UI (e.g., UI 18) and also capture user actions (e.g., clicking on a button or tab, entering alphanumeric characters in an input box or field, opening a window, etc.). In addition to this information, the troubleshooting module 44 and/or troubleshooting sub-routine 52 may also be configured to record a timestamp with respect to a real-world date and time when the user action was detected. Also, the troubleshooting module 44 and/or troubleshooting sub-routine 52 can record a title or descriptive name for the action that was detected (e.g., "click on login button," "main screen" "entry of password," "selection of display format," etc.).

Once the user inputs, usage information, metadata, etc. with respect to the operations of the app 42, 50 are monitored or detected, this information can be stored in any suitable memory device on the end user device 14, 36, 40 and/or in the cloud-based server 12. Then, when a technician (e.g., network operator, administrator, software developer, or other person) wishes to troubleshoot the operations of the app 42, 50, the technician can retrieve the stored information to see the actions that had been taken, when these actions took place, screenshots of the app 42, 50 during use, etc. In particular, as described in more detail below, the cloud-based server 12 may include systems and methods for organizing the detected information to allow the technician to easily perform various troubleshooting or overhead functions as needed.

FIG. 5 is a block diagram illustrating an embodiment of the cloud-based server 12 shown in FIGS. 1 and 2. FIG. 5 shows the functional components of the cloud-based server 12 (or the end user device 14, 36, 40 or a Wi-Fi client device with the capabilities of performing the troubleshooting functions as described herein). The cloud-based server 12 may be a digital computer that, in terms of hardware architecture, generally includes a processing device 62, a memory device 64, input/output (I/O) interfaces 66, a network interface 68, and a database 70. It should be appreciated by those of ordinary skill in the art that FIG. 5 depicts the cloud-based server 12 in an oversimplified manner, and a practical embodiment may include additional components and suitably configured processing logic to support features described herein or known or conventional operating features that are not described in detail herein.

The components (62, 64, 66, 68, 70) are communicatively coupled via a local interface 72. The local interface 72 may be, for example, but not limited to, one or more buses or other wired or wireless connections, as is known in the art.

The local interface 72 may have additional elements, which are omitted for simplicity, such as controllers, buffers (caches), drivers, repeaters, and receivers, among many others, to enable communications. Further, the local interface 72 may include address, control, and/or data connections to enable appropriate communications among the aforementioned components.

The processing device 62 is a hardware device for executing software instructions. The processing device 62 may be any custom made or commercially available processor, a central processing unit (CPU), an auxiliary processor among several processors associated with the cloud-based server 12, a semiconductor-based microprocessor (in the form of a microchip or chipset), or generally any device for executing software instructions. When the cloud-based server 12 is in operation, the processing device 62 is configured to execute software stored within the memory device 64, to communicate data to and from the memory device 64, and to generally control operations of the cloud-based server 12 pursuant to the software instructions. The I/O interfaces 66 may be used to receive user input from and/or for providing system output to one or more devices or components. The user input may be provided via, for example, a keyboard, touchpad, and/or a mouse. System output may be provided via a display device and a printer (not shown). I/O interfaces 66 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 68 may be used to enable the cloud-based server 12 to communicate on a network, such as the cloud service 40. The network interface 68 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 68 may include address, control, and/or data connections to enable appropriate communications on the network. A database 70 may be used to store data. The database 70 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the database 70 may incorporate electronic, magnetic, optical, and/or other types of storage media. In one example, the database 70 may be located internal to the cloud-based server 12 such as, for example, an internal hard drive connected to the local interface 72 in the cloud-based server 12. Additionally, in another embodiment, the database 70 may be located external to the cloud-based server 12 such as, for example, an external hard drive connected to the I/O interfaces 66 (e.g., SCSI or USB connection). In a further embodiment, the database 70 may be connected to the cloud-based server 12 through a network, such as, for example, a network-attached file server.

The memory device 64 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory device 64 may incorporate electronic, magnetic, optical, and/or other types of storage media. Note that the memory device 64 may have a distributed architecture, where various components are situated remotely from one another but can be accessed by the processing device 62. The software in memory device 64 may include one or more software programs, each of which includes an ordered listing of executable instructions for implementing logical functions. The software in the memory device 64 includes a suitable operating system (O/S) and one or more programs. For example, one program may be a troubleshooting program 74 configured to enable the technician to troubleshoot the app 42, 50. The operating system essentially controls the execution of other computer programs, such as the troubleshooting program 74 or other programs, and provides scheduling, input-output control, file and data management, memory management, and communication control and related services. The one or more programs may be configured to implement the various processes, algorithms, methods, techniques, etc. described herein, such as related to troubleshooting one or more corresponding apps (e.g., app 42, 50).

Figure 6A:
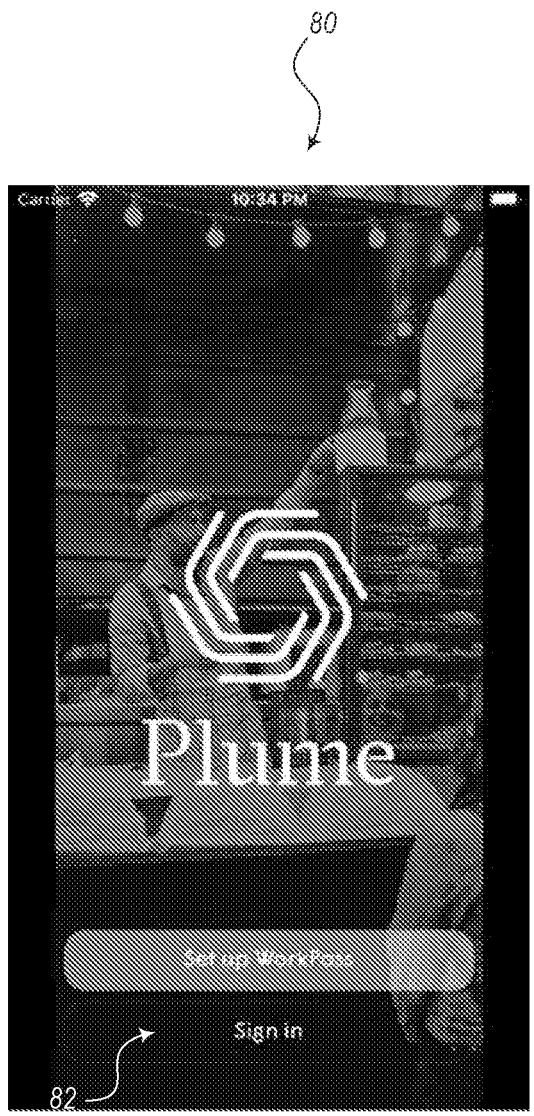
FIGS. 6A and 6B are User Interface (UI) screenshots showing examples of an application running on an end user device, according to various embodiments.
Figure 6B:
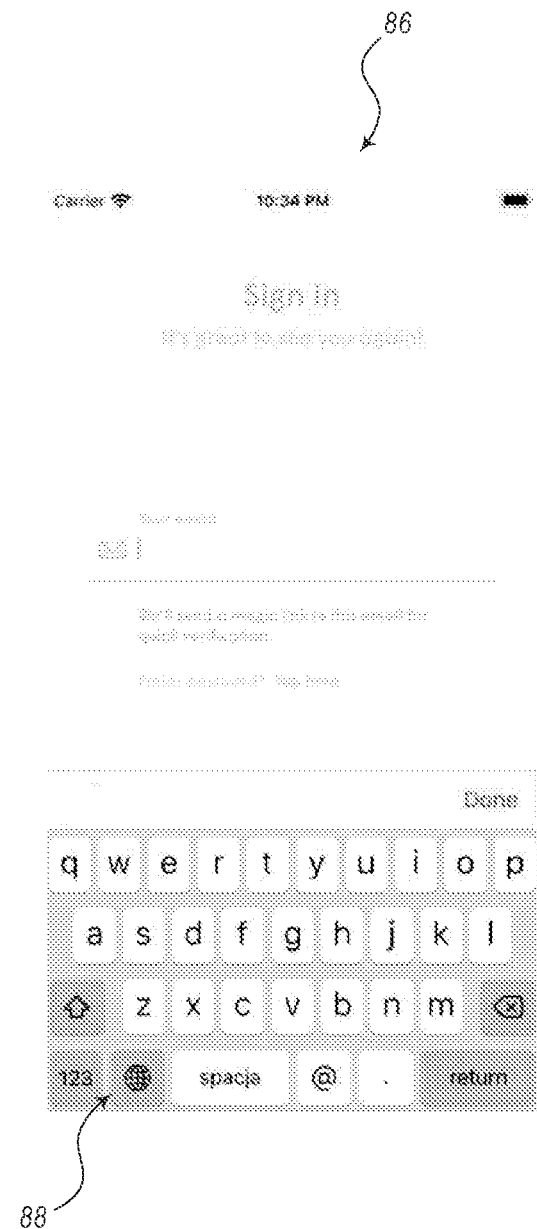

FIGS. 6A and 6B show examples of User Interface (UI) screenshots displayed on a mobile device. For example, FIG. 6A shows an initial screenshot 80 of a corresponding UI that is displayed when a user first opens an app. In this example, the app is a "WorkPass" app that is associated with Plume, to which the present application is assigned. In this app, when a user clicks on the "Sign in" button 82 on the initial UI page, the app presents a new UI display 86 as shown in FIG. 6B. This UI display 86 allows a user to enter his or her email into an input field and/or allows the user to enter a password if the user prefers this sign-in method instead. A keyboard 88 is provided on the UI screen 86 configured to receive user input of the various character buttons. It may be noted that additional operations may be performed and user input may be received at different times during usage of the app. Thus, the UI screenshots shown in FIGS. 6A and 6B as well as other common screenshots can be presented according to normal operations of the app.

Many conventional systems may record data associated with the usage of an app. However, as mentioned above, the data may be recorded in a way that might be difficult to interpret and may include much more information than what may normally be needed to properly troubleshoot the app. Some conventional systems may include storing a video of the entire operation of the app, which, of course, may require a very large file for storing the entire video. Also, the video may take a long time to analyze, especially if there are long pauses between each user action or the user delays for whatever reason while running the app.

In order to overcome the deficiencies of the conventional systems, the embodiments of the troubleshooting program 74 of the present disclosure may be configured to store screenshots only at specific times during usage. For example, for troubleshooting purposes, it is usually not normally necessary to view each and every user keystroke. Instead, in some embodiments, the troubleshooting program 74 may capture one screenshot immediately after the user enters the last character in a string and before he or she presses an "enter" button (or other similar button).

In addition to saving certain UI screenshots, the embodiments of the troubleshooting program 74 are also configured to save a timestamp associated with each screenshot, which may include a date and time. Also, the embodiments may store a description of what action had been taken (e.g., "entry of password," "selection of first set of choices," etc.). As is shown below, the troubleshooting program 74 can also be configured to store the screenshots in a single image file (e.g., jpg file). The screenshots may be separated by a space, which may include a header. The header may include the timestamp information and the user action description. Then, during troubleshooting or reviewing test execution results, the technician may open up the single image file to view the sequence of screenshots along with the descriptive information in the headers.

FIGS. 7A-7M, in combination, show a continuous sequence of images from the single image file, described collectively as FIG. 7. In some embodiments, the cloud-based server 12 may allow a technician or admin to troubleshoot the app operations. The technician may open up the single image (as shown in FIG. 7), which may be displayed on a display device associated with the cloud-based server 12. Thus, the technician can troubleshoot the operations of the app obtained during usage of the app on the end user device 14, 36, 40.

The troubleshooting program 74 includes a first stage of receiving user input data and screenshots obtained by the troubleshooting module 44 and/or troubleshooting sub-routine 52 during operation of the app. Then, the troubleshooting program 74 is configured to organize the storing of this received information along with other metadata (e.g., timestamps, user actions, etc.). The stored app usage files may be stored in image files similar to the format shown in FIG. 7. Also, headers may be added to separate each subsequent screenshot, providing the time and date when a next action occurs. In addition, the troubleshooting program 74 is configured to store highlighting features to assist in the demonstration of what actions the user has taken. For example, if the user presses a certain button, the troubleshooting program 74 may be configured to save a highlighting feature (e.g., a red outline around the selected button) to show that the user pressed that button. Then, the stored image files can be reviewed at a later time (by the technician). When opened, the image file, as shown in the example of FIG. 7, may be displayed on the technician's device (e.g., cloud-based server 12). Compared with the two screenshots of FIGS. 6A and 6B, the single image of FIG. 7 includes the header information, the highlighting features, the entered text (before submission), etc.

As shown in FIG. 7, headers 100a, 100b, . . . , 100w are displayed before the start of each respective screenshot 102a, 102b, . . . , 102w. According to various embodiments, a space having any suitable size and/or shape may be inserted between each subsequent pair of screenshots 102. These spaces may be partially or completely filled by the headers 100. In some embodiments, the headers 100 may be partially or fully superimposed over a top portion of the corresponding screenshot and may include transparent or translucent text and/or background aspects. In some embodiments, a small space may be created between the headers 100 and screenshots 102.

Figure 7A:
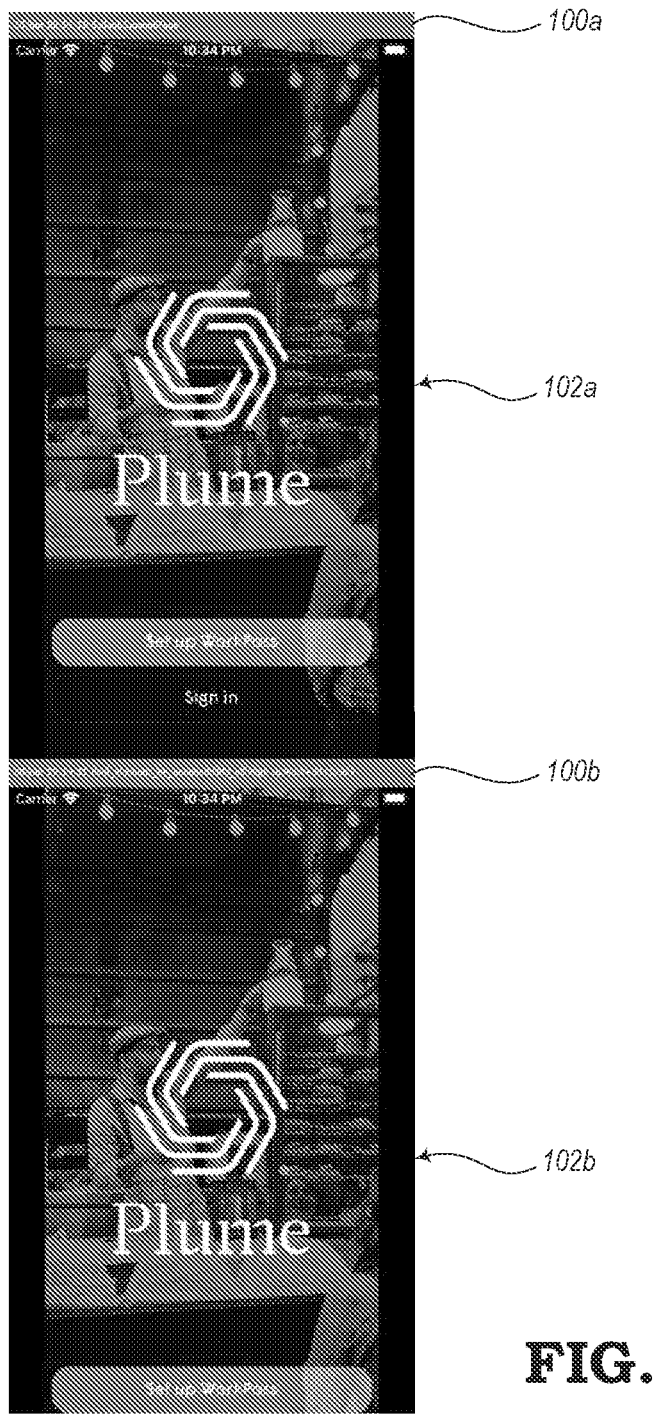
FIGS. 7A-7M, in combination, show a single image file displayed on an admin device for troubleshooting the operation of an application on an end user device, according to various embodiments.
Figure 7B:
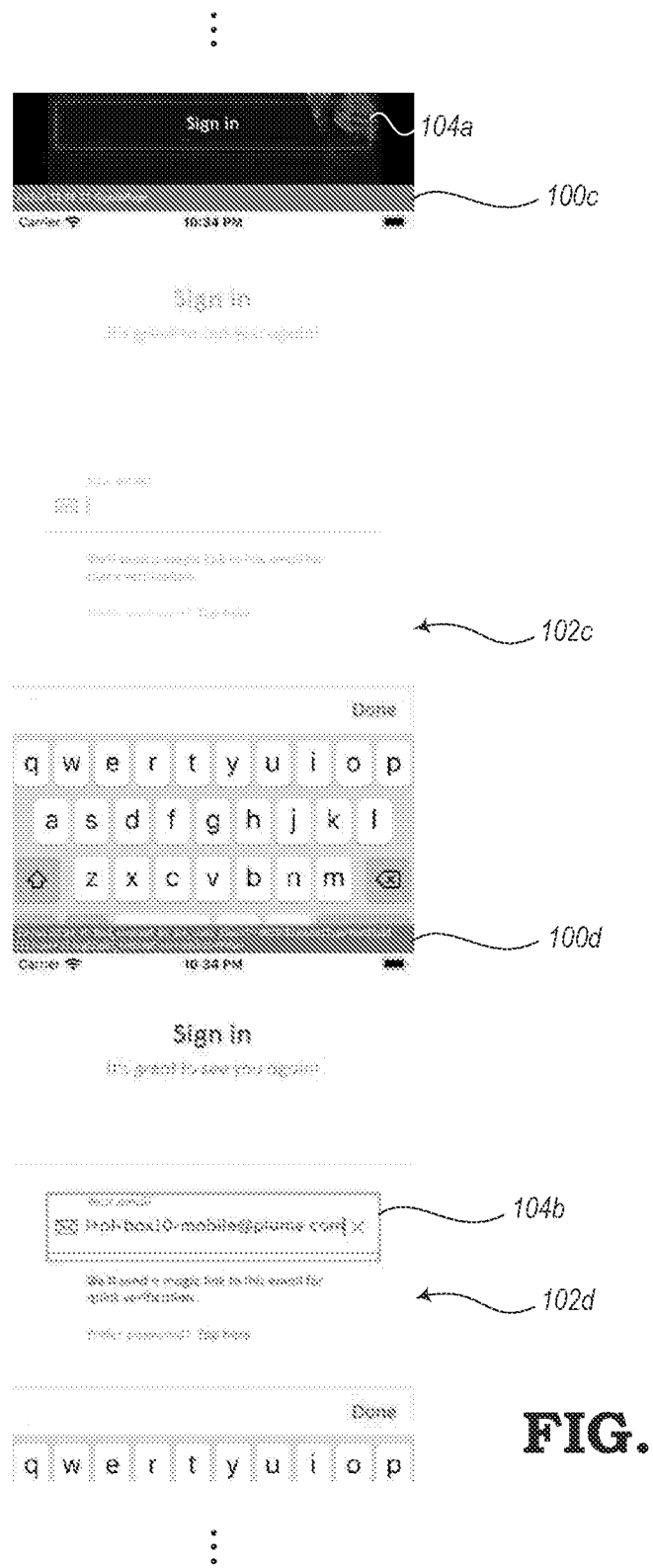
Figure 7C:
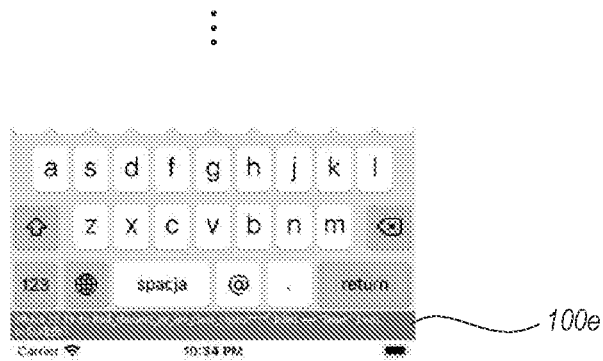
Figure 7C:
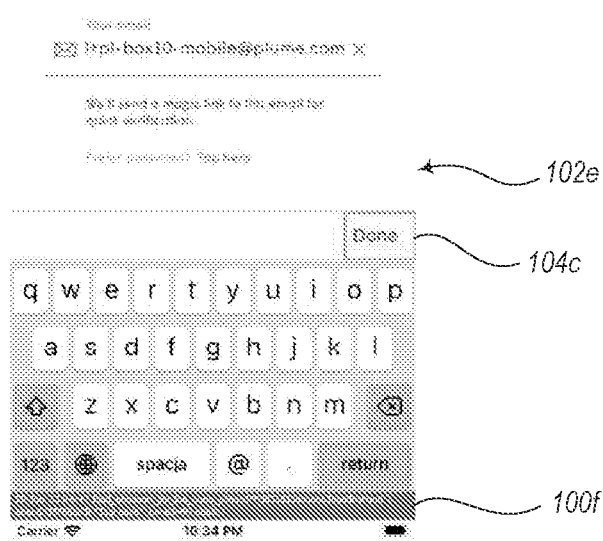
Figure 7C:
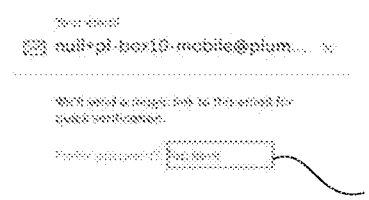
Figure 7D:
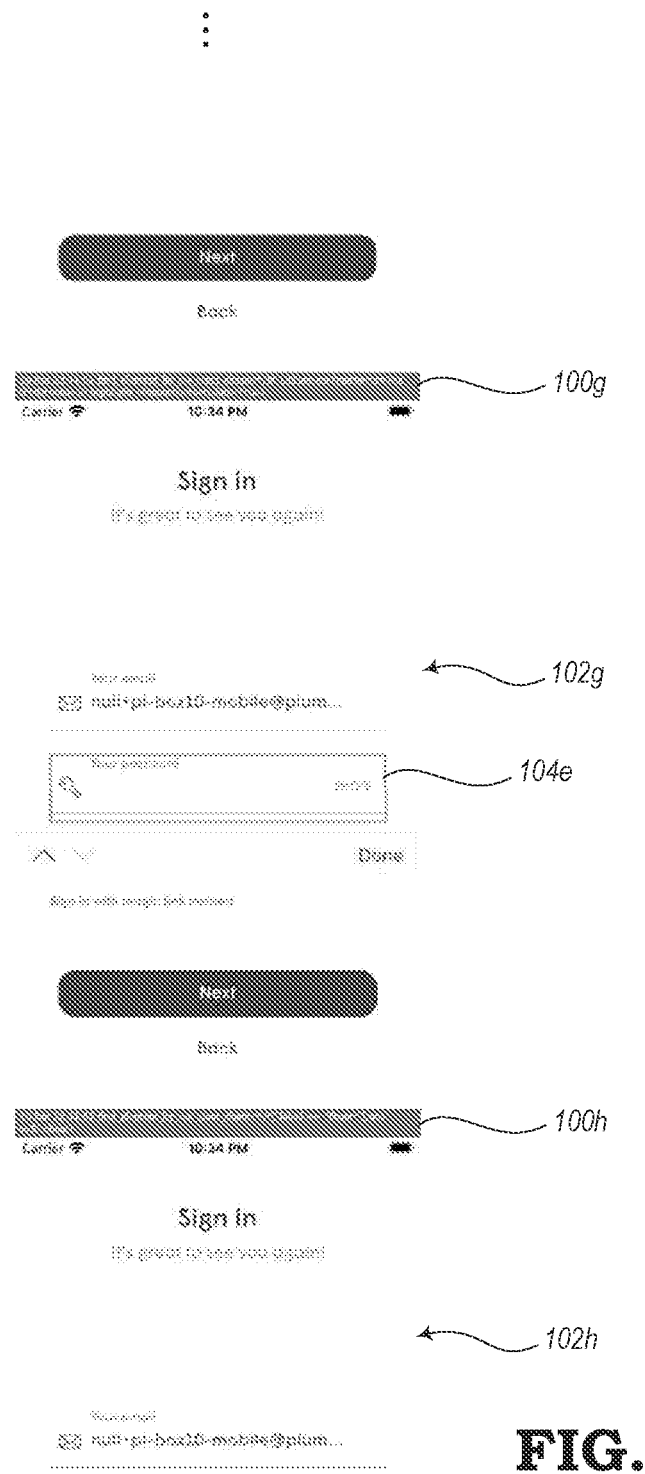
Figure 7E:
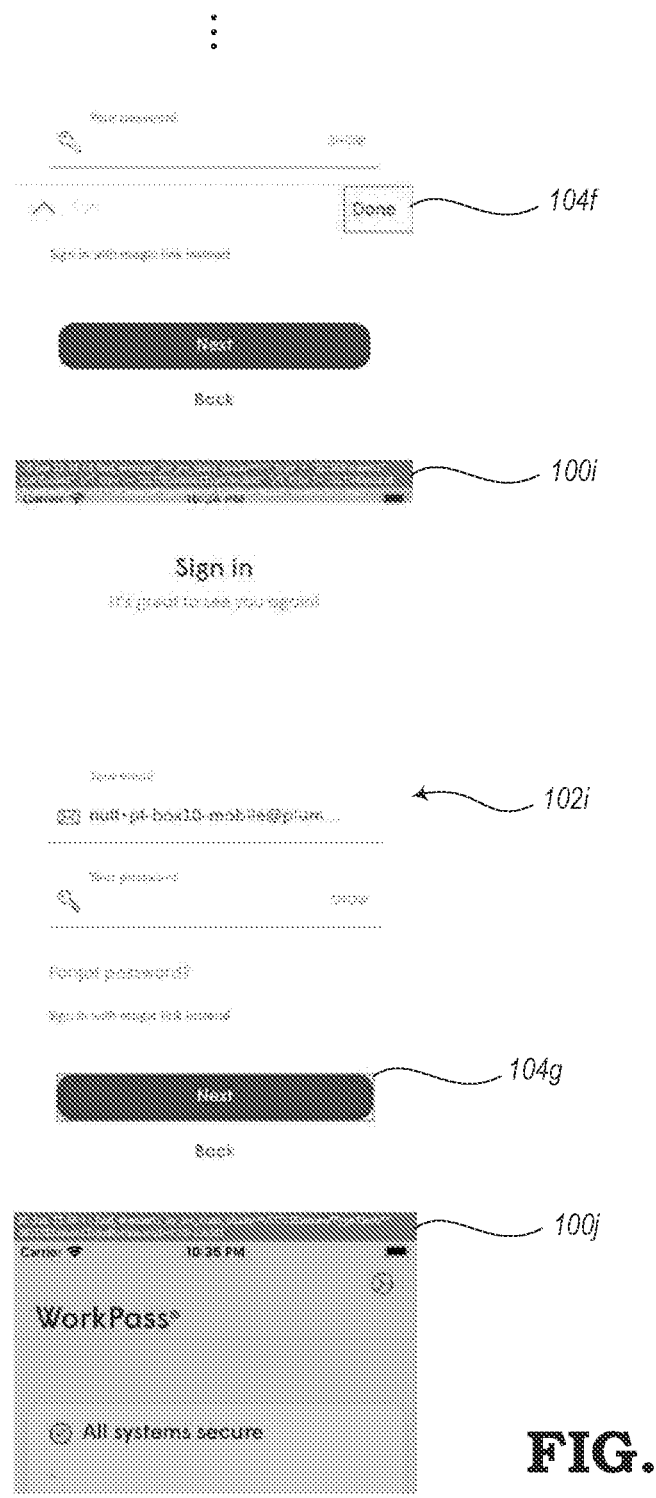
Figure 7F:
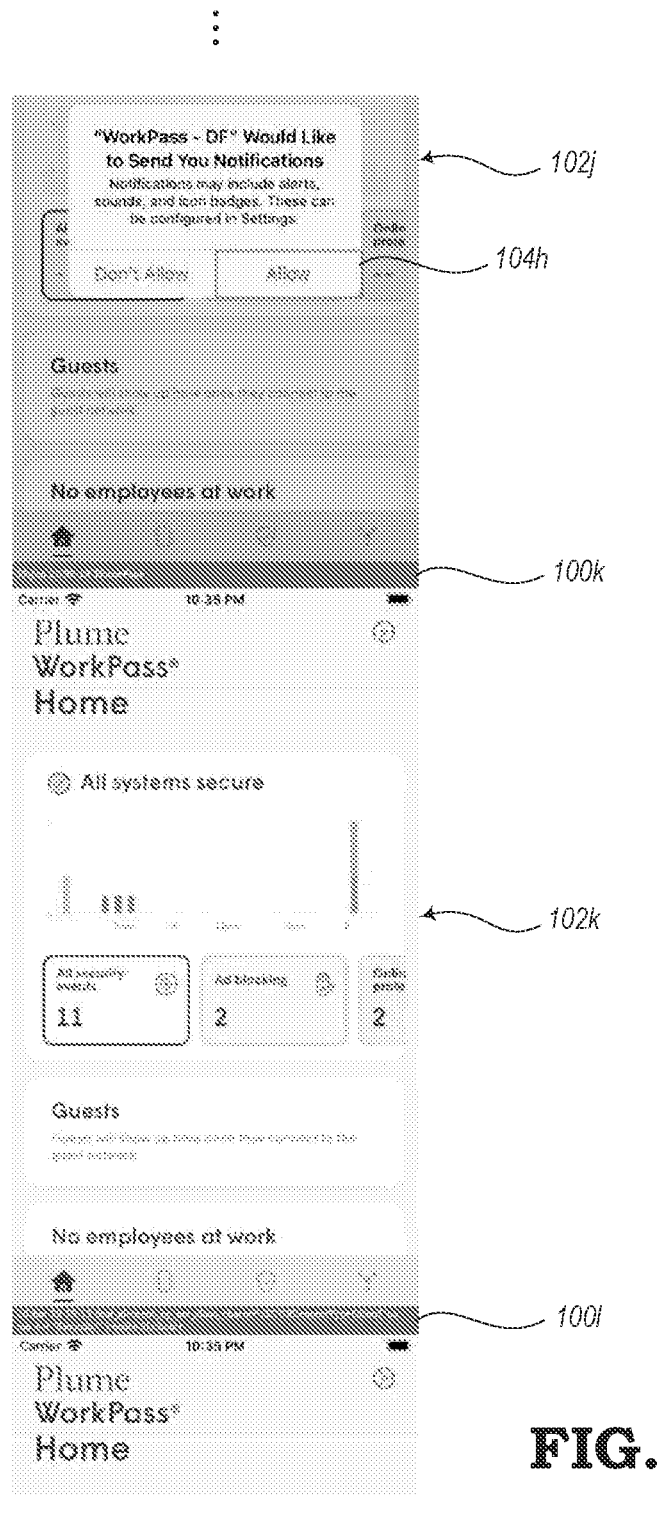
Figure 7G:
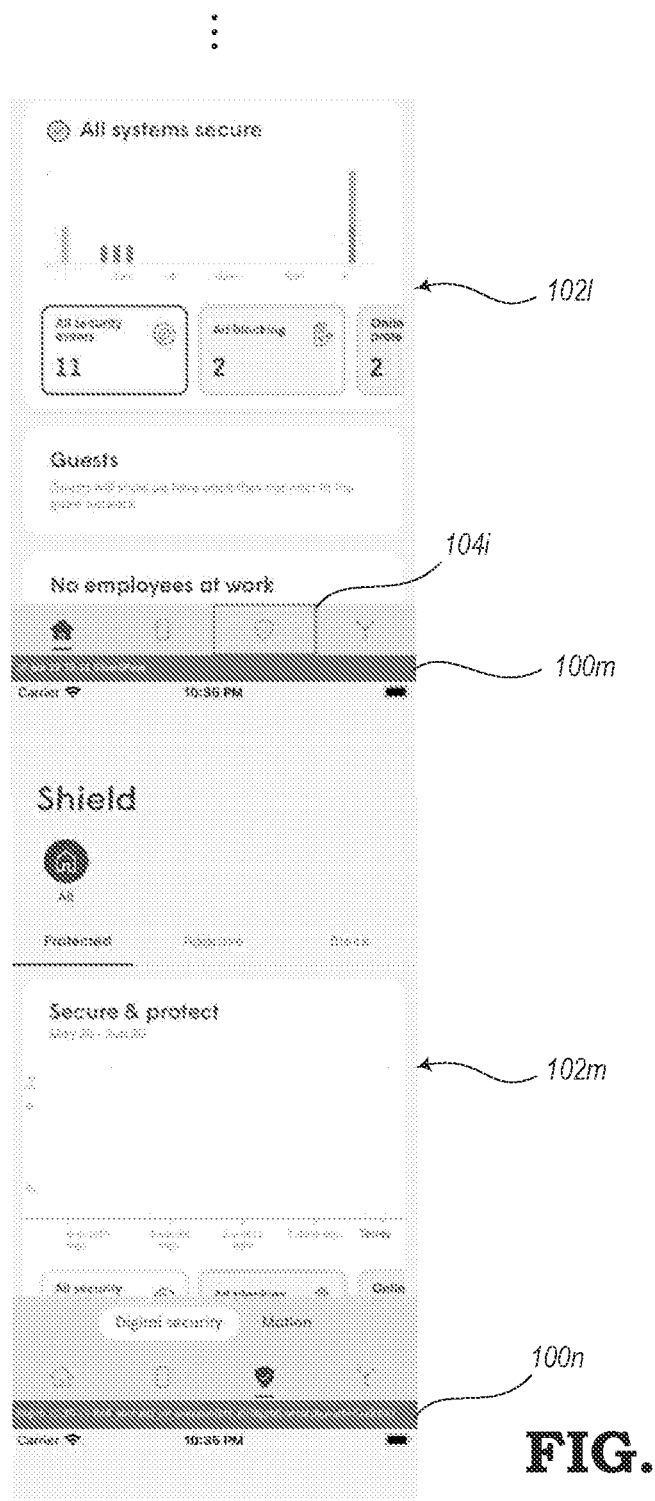
Figure 7H:
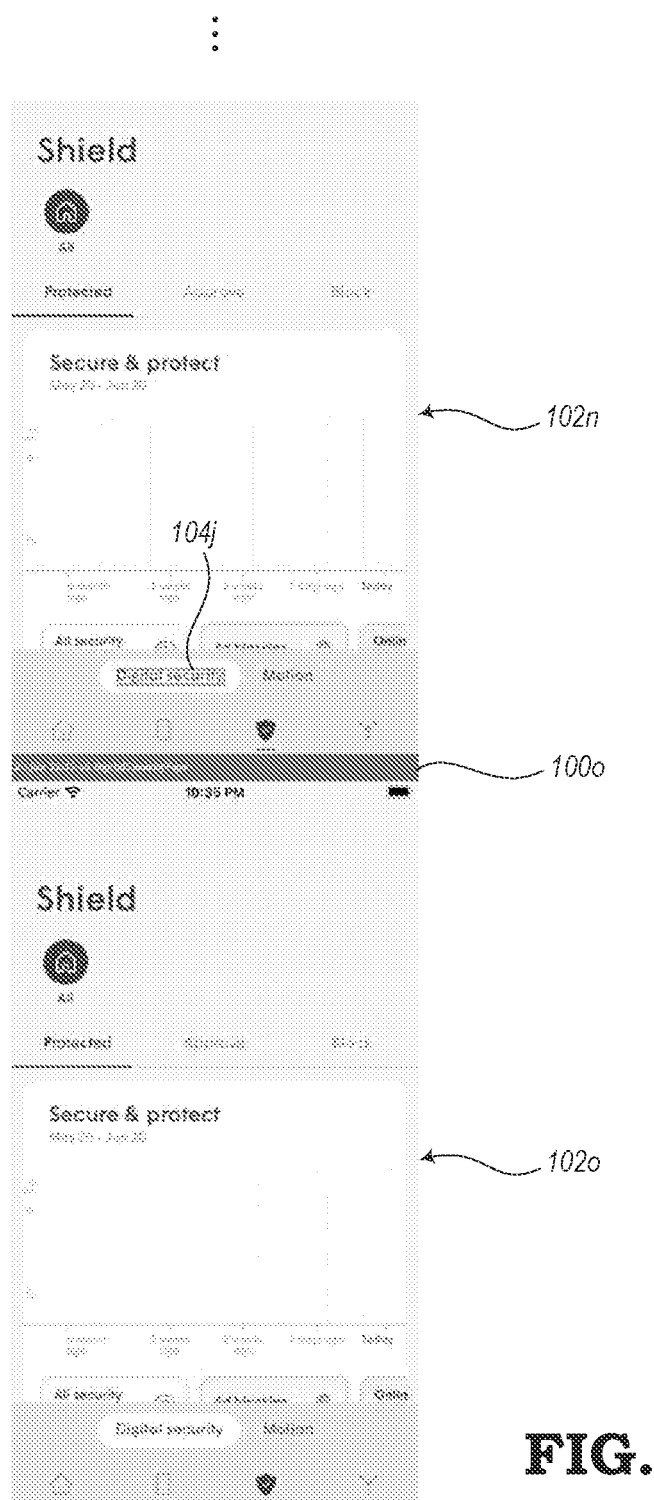
Figure 7I:
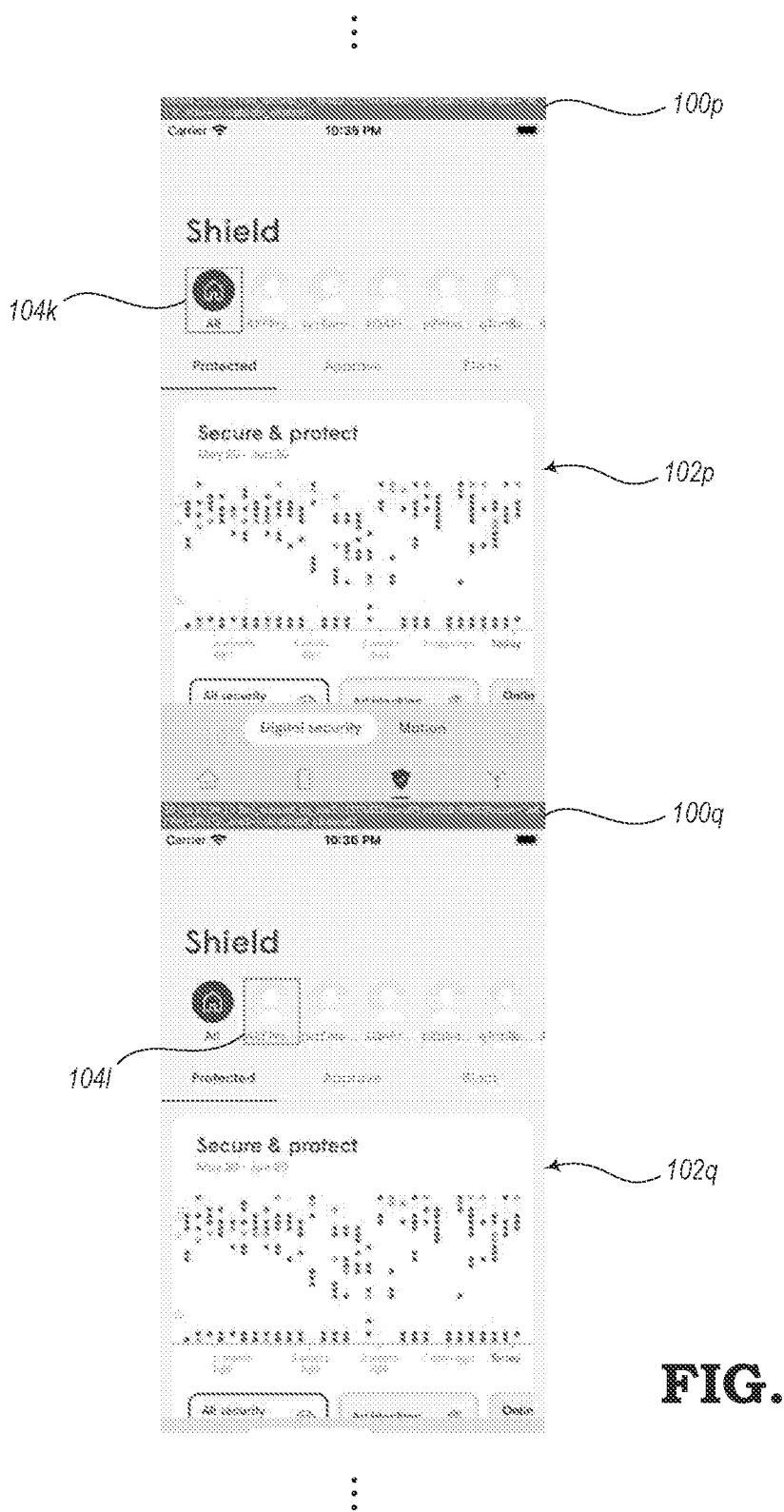
Figure 7J:
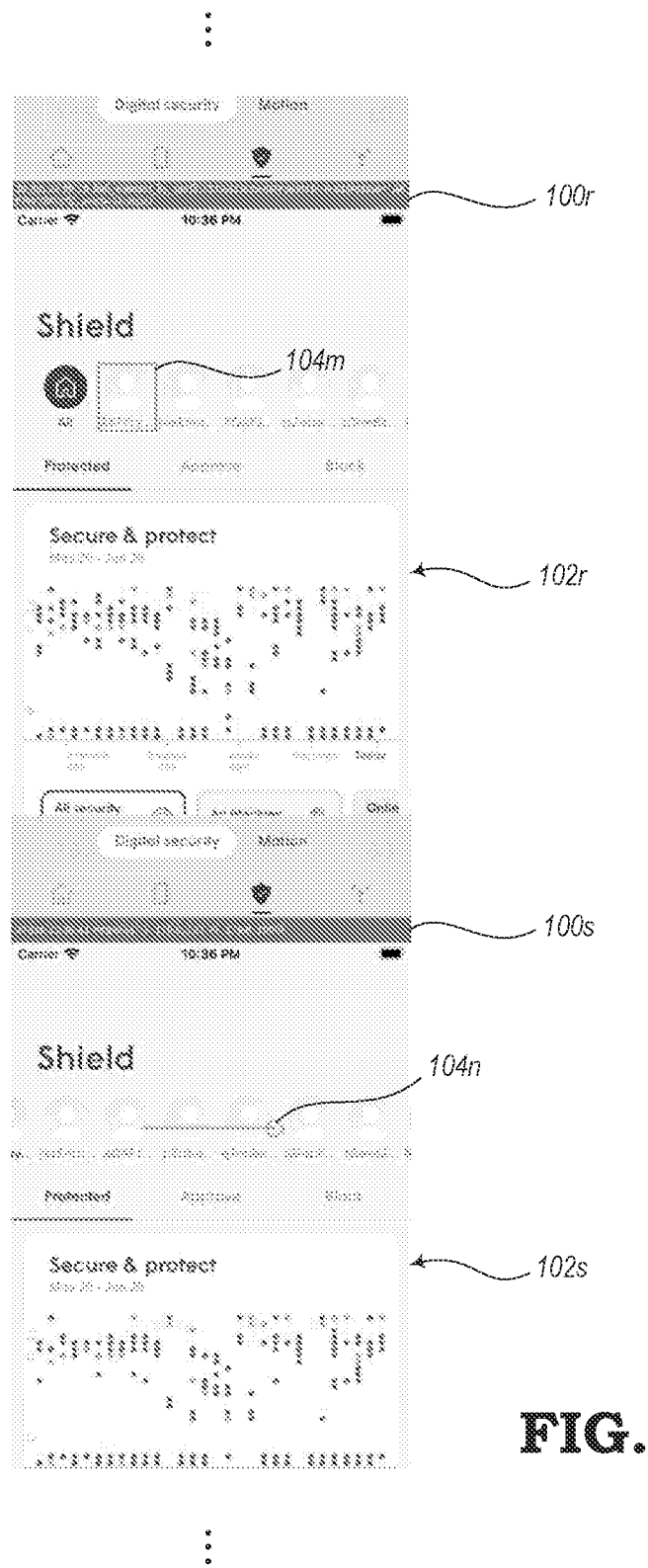
Figure 7K:
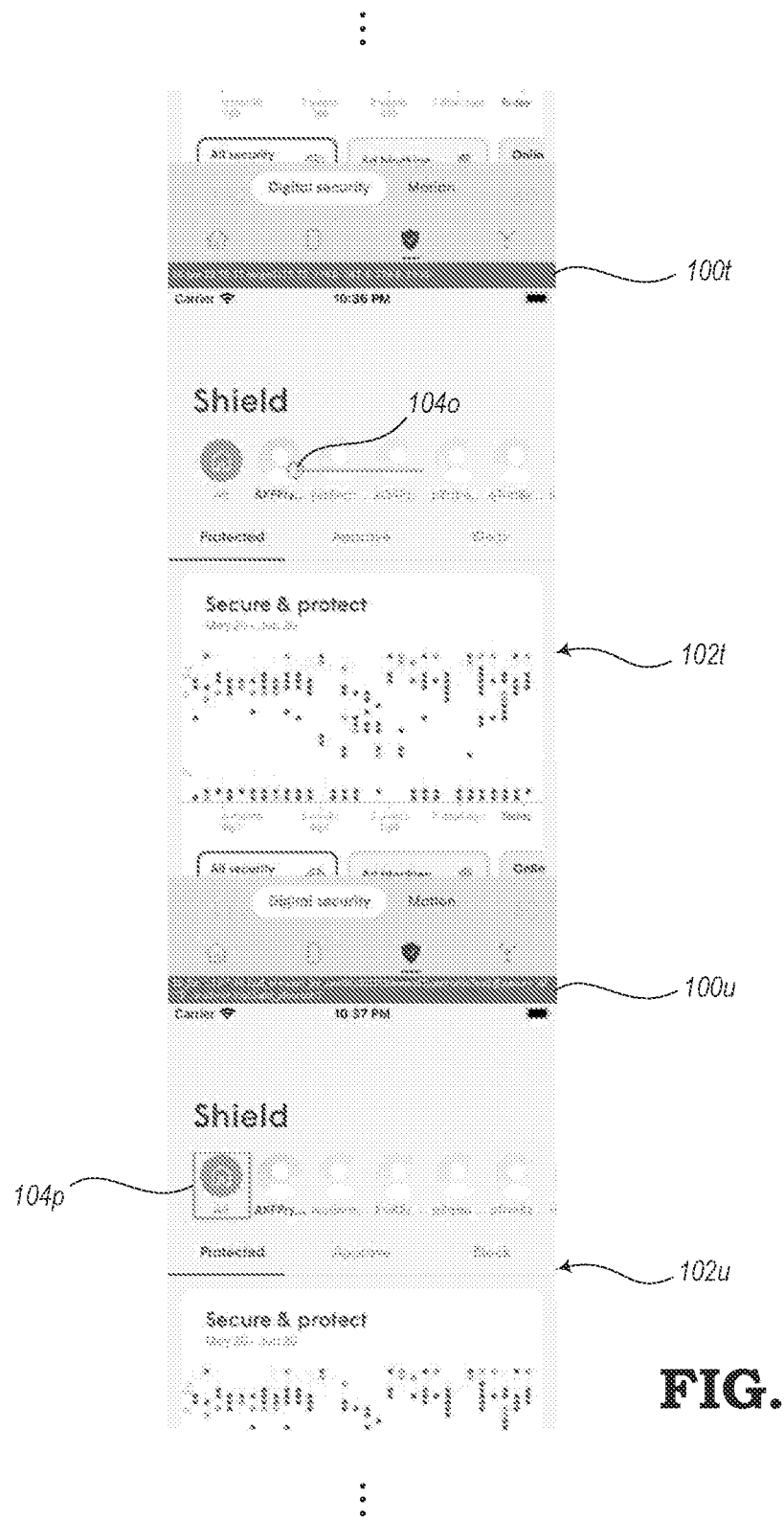
Figure 7L:
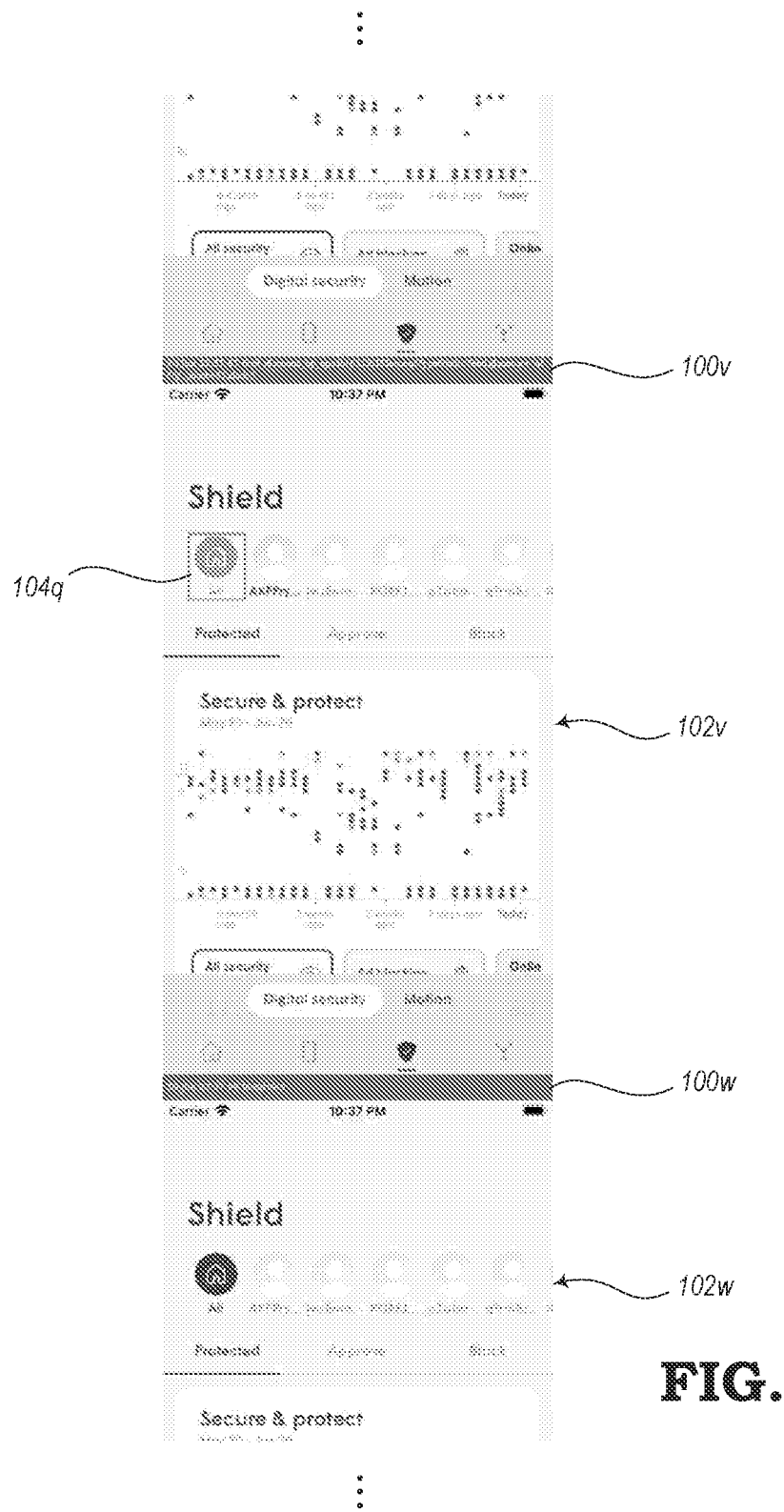
Figure 7M:
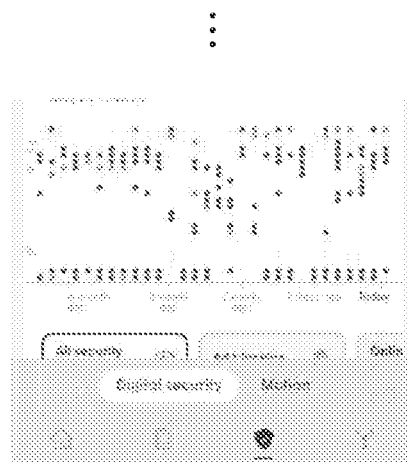

The headers 100 may include a corresponding timestamp representing when the subsequent screenshot 102 was first presented on the UI. As shown in FIG. 7A, the first header 100a, for example, includes the text "20-Jun 22:34:26 SplashScreenPage," which include date information (i.e., June 20$^{th}$), time information (i.e., 10:34:26), and a descriptive feature (i.e., SplashScreenPage). Thus, the technician can determine from this header 100a that the Splash Screen Page was first opened at 10:34 pm and 26 seconds on June 20$^{th}$.

After the initial page is opened, the first action by the user is the pressing of the "Sign in" button, as shown by the highlighting feature 104a (e.g., a red outline around the Sign in button). Then, as indicated by the header 100c, the SignInPage is opened at 22:34:32, which is shown in the screenshot 102c in FIG. 7B. The sign in page, in this example, allows a user to enter an email address. As such, the highlighting feature 104b shows a red outline of the email entry field and shows the text entered by the user. Again, the screenshot 102d only shows when the entire text is entered to simplify what is provided to the technician.

In this example, the next highlighting feature 104c shows that the user pressed the "done" button. The highlighting feature 104d shows that the user then pressed the "tap here" area (e.g., button). to enter a password. Additional user entries are recorded by the troubleshooting program 74 and can be reviewed by the technician. In all, highlighting features 104a-104q are shown in FIG. 7 representing 17 different highlighted user actions in the 23 different screenshots.

By recording the entire sequence of actions and screenshots, it is possible for a technician to easily see how the app was operated. The technician may then be able to easily determine if there were any actions that caused the app to perform improperly and to determine any glitches or bugs in the programming. This information can then be used, particularly during beta tests, to debug the app and fix any problems.

Thus, the continuous image shown in FIG. 7 may be a single image file (e.g., jpg file) composed of many screenshots, which may be automatically captured upon some web driver action that triggers UI changes, such as click, send_keys, scroll page, get, etc. Every screenshot includes a header bar with date/time and user web driver actions that caused the screenshot actions. Buttons, labels, and other elements being selected or clicked may be highlighted according to the various embodiments, such as the red outlining as shown in the highlighted features 104. The example of FIG. 7 shows the use of a mobile app with a vertical oriented screen display. It should be noted that other display formats may be applicable for other types of screens and monitors for other types of computers, tablets, laptops, etc.

Figure 8:
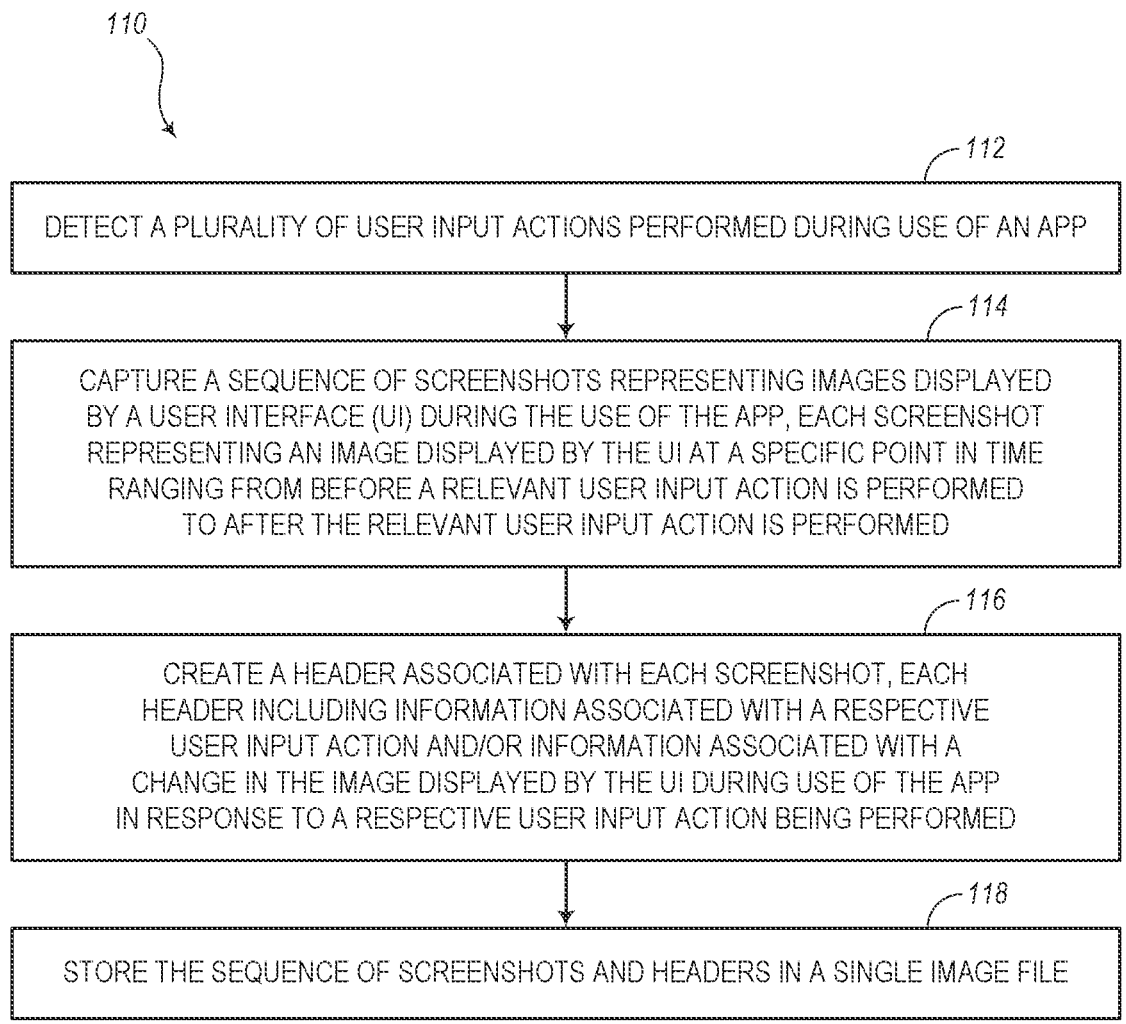
FIG. 8 is a flow diagram illustrating a method for troubleshooting an application running on an end user device, according to various embodiments.

FIG. 8 is a flow diagram illustrating an embodiment of a method 110 for troubleshooting an application (app) running on an end user device. As shown, the method 110 includes a step of detecting a plurality of user input actions performed during use of an app, as indicated in block 112. The method 110 also includes capturing a sequence of screenshots representing images displayed by a User Interface (UI) during the use of the app, as indicated in block 114. Each screenshot represents an image displayed by the UI at a specific point in time ranging from before a relevant user input action is performed to after the relevant user input action is performed. Also, the method 110 includes the step of creating a header associated with each screenshot, as indicated in block 116. Each header includes information associated with a respective user input action and/or information associated with a change in the image displayed by the UI during use of the app in response to a respective user input action being performed. Then, the method 110 includes the step of storing the sequence of screenshots and headers in a single image file, as indicated in block 118.

In some embodiments, the method 110 may also include the steps of a) opening the single image file in response to a troubleshooting request, and b) receiving instructions from a troubleshooter to scroll through the sequence of screenshots and headers. For example, the step of storing the sequence of screenshots and headers (block 118) includes the step of storing the screenshots and headers in a vertical column to enable vertical scrolling.

According to some embodiments, the method 110 may include the step of adding a highlighting feature to each of one or more screenshots. Each highlighting feature, for example, may represent a respective user input action being performed. Also, each highlighting feature may be a colored outline (e.g., red box) around a selected button or field related to the respective user input action.

Each header may include a timestamp defining a date and time when a respective screenshot was displayed by the UI during the use of the app. Also, the single image file may be a jpg file in which image data is compressed. In some embodiments, one or more of the user input actions may be entry actions associated with typing alphanumeric characters in a text field. For each of the entry actions, the method 110 may include capturing a screenshot immediately before a user submits the typed alphanumeric characters, clicks on an enter button, or other action ending the typing event for this particular user action.

In some embodiments, the app may be a mobile app running on a mobile device. Also, the method 110 may be executed by the mobile device itself or may be performed by a remote device in communication with the mobile device. In other embodiments, the app may run a computer, laptop, tablet, or other similar computing device. Again, the method 110 in this case may be executed by the computing device itself or by a remote device in communication with the computing device. The user input actions, for example, may include a) keystrokes, b) text entry, c) virtual button presses, d) mouse clicks, e) keypad entries, f) option selections, g) screen manipulation commands, and/or other types of user actions associated with use of the app.

Some of user input actions may include button press actions. In response to each button press action, the method 110 may also include capturing a first screenshot immediately before the button press action and then adding a highlighting feature to the first screenshot to highlight the button being pressed by the user. Then, the method 110 may include capturing a second screenshot of a new screen displayed by the UI immediately after the button press action.

The systems and methods of the present disclosure may relate to front end automation. Since it may be difficult for a troubleshooter or debugger to analyze raw text obtained during usage of an app, the systems and methods of the present disclosure are configured to present easy to understand UI screenshots and actions that result in changes to the UI display. For example, in some test cases, it may be possible to store a relatively small number (e.g., 20-30) of screenshots. In contrast to conventional system, the systems and methods of the present disclosure are configured to merge the screenshots into a single image file (e.g., jpg). Compression can be applied to the data file by noting the small differences from one screenshot to the next. Also, other compression algorithms, such as zip, can be used to minimize the size of the image file. In addition, the screenshots may be saved in a lower resolution to reduce the size. In some case, it may be possible to reduce the size of a troubleshooting file down to about 1 MB or less, as opposed to hundreds of MBs per test case for video, which can be quite cumbersome. Even for a troubleshooting file with thousands of screenshots, it may be possible to reduce the size of the file to less than 1 GB.

It may also be noted that the user does not need to do anything to trigger the saving of screenshots. Instead, the troubleshooting program 74 may be configured to automatically capture the screenshots at specific times, such as when the user clicks a button, enters text, scrolls up or down, scrolls left or right, etc. Additional information can also be automatically saved by the troubleshooting program 74, such as a description of the user actions, page definitions (e.g., "Login page"), page layout information, URL information, etc. Again, this additional information (e.g., metadata) can be presented in the headers 100. Each header may include web driver information. In some embodiments, the troubleshooting program 74 may use a Selenium web driver, an Appium web driver, or the like, and/or any suitable Application Programming Interface (API). Also, the app may be Android or iOS based.

The user inputs or actions are used as triggers that can be used to determine when a screenshot is to be captured. Some actions may include clicking on a button, pressing a key, scrolling to a page, refreshing a page, etc. Also, as mentioned above, the troubleshooting program 74 is configured to identify a pertinent element on a screenshot where the user is performing or has performed an action. This is referred to as highlighting and may include emphasizing or identifying a button that the user has pressed, a field in which the user is entering data, etc. For example, if the user presses a "home" button, a screenshot of the UI just before the pressing of this button can be captured and a highlighting feature (e.g., a red box) can be added around the home button to indicate that the user pressed the home button. Then, a subsequent screenshot may be captured showing a "home" page that results from the user pressing the home button.

The troubleshooting program 74 is configured to highlight where the user action, such as a button that was pressed (e.g., a "System User" button). For an input (or text) field being filled in by user, the troubleshooting program 74 can capture an image of the entered alphanumeric characters right before some other trigger button (e.g., "enter," "go," "next," etc.) is pressed so the troubleshooter can see what was typed in. The highlighted element can be a call for taking a screenshot explicitly or implicitly.

The troubleshooting program 74 may be part of a browser testing program, but instead is configured to capture an image (or two) for every web driver call, as opposed to conventional systems that might generate hundreds of screenshots, which can be excessive. Also, some conventional system may create one file for each screenshot, which can make it difficult for the troubleshooter to switch from one image to the next and can be time-consuming.

From a software perspective, the user input actions may be defined in the code as "click," "click_raw," "clear," "back," "forward," "refresh," "swipe," "press_button," "press_got-it_button," press_OK_button," "disclaimer_accept_button," "activate_app," "terminate_app," "send_keys," "hover," "drag_and_drop," etc. These and other similar types of actions can be interpreted as triggers that may cause the app to perform certain actions and cause the UI to change a screen or display and/or cause one or more other changes on the UI. Also, it may be noted that not every web driver call is necessarily used to trigger some action.

Figure 9:
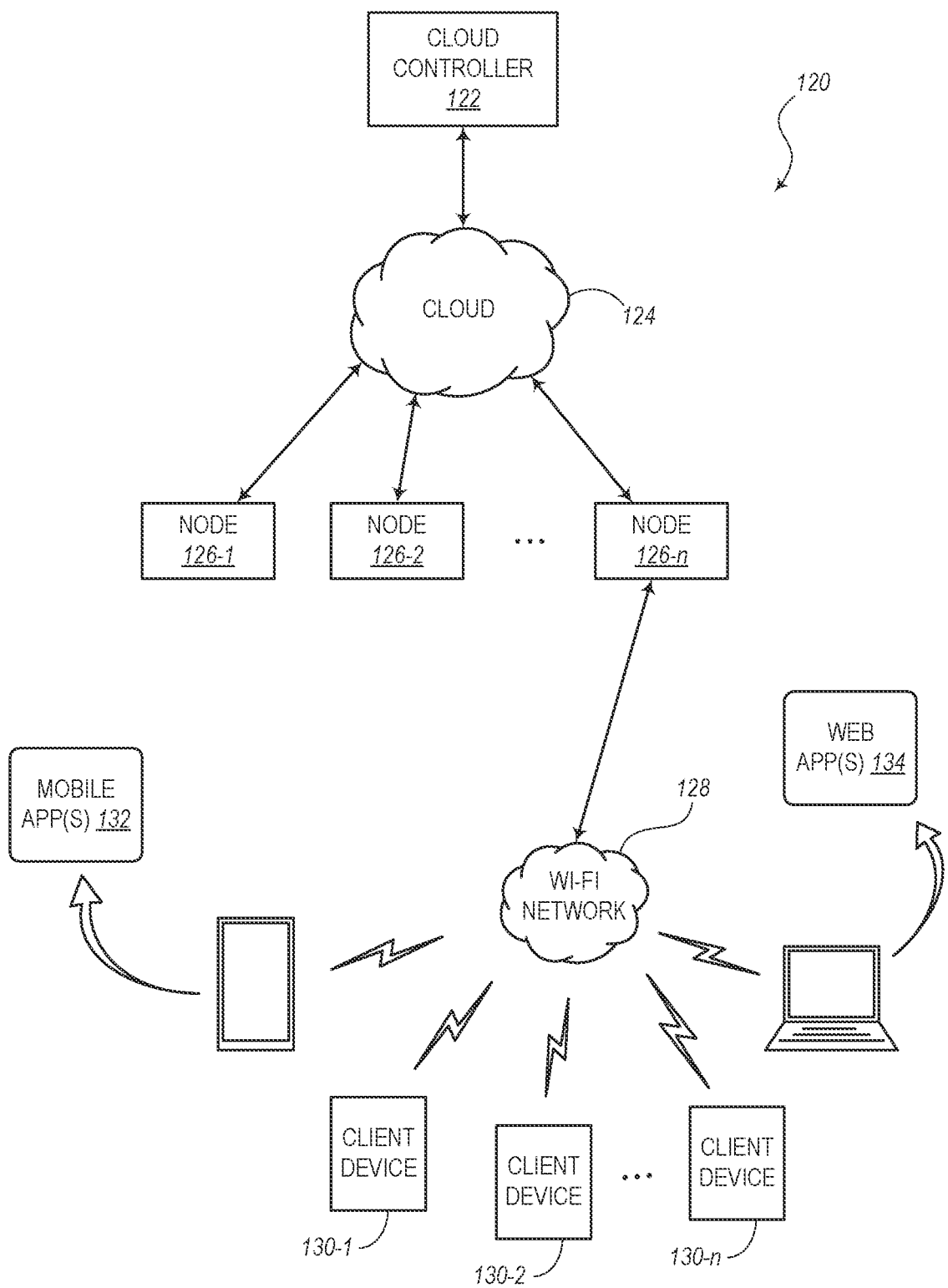
FIG. 9 is a block diagram illustrating a mesh Wi-Fi system in which a Wi-Fi network is tested, according to various embodiments.

FIG. 9 is a block diagram illustrating an embodiment of a mesh Wi-Fi system 120. The mesh Wi-Fi system 120 may include many of the same or similar components as those shown in the communications system 30 of FIG. 2. As illustrated, the mesh Wi-Fi system 120 includes a cloud controller 122, which may be configured as a cloud-based server (e.g., cloud-based server 12), testing system, Network Operations Center (NOC), web management interface, etc. The cloud controller 122 is configured to communicate with multiple Wi-Fi networks via a cloud 124 (e.g., Wide Area Network (WAN), the Internet, etc.). The cloud controller 122 is configured to manage, test, verify, and validate hardware and software components associated with each of the Wi-Fi networks.

The mesh Wi-Fi system 120 further includes a plurality of nodes 126-1, 126-2, . . . , 126-n. Each of the nodes 126 may be any suitable type of gateway device (e.g., modem, router, etc.) for connecting a respective Wi-Fi network to the cloud controller 122 via the cloud 124. For simplicity, only one local Wi-Fi network 128 is shown in FIG. 9. The local Wi-Fi network 128 may include one or more modems, routers, access point devices, pods, leaves, extenders, etc. for enabling wireless communication with one or more clients devices 130-1, 130-2, . . . , 130-n. The client devices 130 may be configured as end-user devices, such as computers, laptops, tablets, mobile devices, smartphones, Internet of Things (IoT) devices, wearable smart devices, etc. The nodes 126, local Wi-Fi network 128, and client device 130 may be configured to operate using any suitable operating protocols, standards, etc., such as OpenSync. For example, OpenSync is a cloud-agnostic, open source software solution used for the management of Wi-Fi services in a localized residential or business environment. OpenSync may be configured to manage the current status of connectivity and services in the local Wi-Fi network and may provide access control, cybersecurity, parental controls, automated IoT onboarding, telemetry, and other services.

Also, in addition to the hardware (HW) components shown in FIG. 9, the mesh Wi-Fi system 120 is configured allow these HW components to run various software (SW) and/or firmware (FW) programs. For example, some SW/FW programs designed to be run in the mesh Wi-Fi system 120 include one or more mobile apps 132, which may run on mobile devices (e.g., smartphones). Other SW/FW programs designed to be run in the mesh Wi-Fi system 120 include one or more web apps 134, which may run on computers, laptops, tablets, etc. The mobile apps, for example, may include HomePass (offered by Plume, the Applicant of the present disclosure), WorkPass (also offered by the Applicant), among other programs that are currently offered or may be offered in the future by any vendors, allowing a user to perform various home-related or work-related tasks. The web apps, for example, may include Frontline (also offered by the Applicant), among other programs that are currently offered or may be offered in the future by any vendors, allowing a user to monitor the operational status of the mesh Wi-Fi system 120.

The mesh Wi-Fi system 120 is configured such that the cloud controller 122 can monitor the HW components (e.g., the nodes 126, local Wi-Fi networks 128, client devices 130, etc.) and also the SW/FW components (e.g., the mobile apps 132, web apps 134, etc.). Therefore, instead of merely monitoring hardware components, as is normally done in conventional systems, the cloud controller 122 of the present disclosure is configured to further monitor the software/firmware components as well. Furthermore, the testing framework of the mesh Wi-Fi system 120 is configured to run HW and SW/FW tests in a single test run using one set of testing parameters without the need to perform different tests. Thus, this combination of testing, verifying, validation, etc. on both HW and SW in one pass is considered to provide improvements over conventional systems and avoid some common issues that may arise in conventional systems.

In some respect, the mesh Wi-Fi system 120 of FIG. 9 may represent various embodiments of systems and methods, described herein, for providing an automated test framework for monitoring, testing, validating, verifying, etc. the HW and SW components of a cloud-based Wi-Fi network. The systems and methods of the present disclosure are configured to improve upon conventional systems by providing a way to automatically test all components of a multi-layered, complex hardware/software platform for cloud-based Wi-Fi components (e.g., routers, extenders, mobile apps (iOS, Android, etc.), web apps, etc.). As such, the present disclosure provides a test automation framework that enables access to log data associated with HW components, Devices Under Test (DUTs), Systems Under Test (SUTs), etc. and log data associated with SW components (e.g., mobile apps, web apps, etc.).

Furthermore, it should be understood that the automated test framework of the present disclosure may be configured to monitor components during normal operation and may also monitor components during a trial period (e.g., in a lab using simulated device behaviors, using a sandbox-type arrangement, etc.). In some cases, the automated test framework may use any combination of real-world monitoring and simulated monitoring. For example, new SW/FW releases may be proposed and may be tested in a real-world or simulated environment to test not only how the proposed new release may operate, but also how the HW devices may behave with the proposed release.

Figure 10:
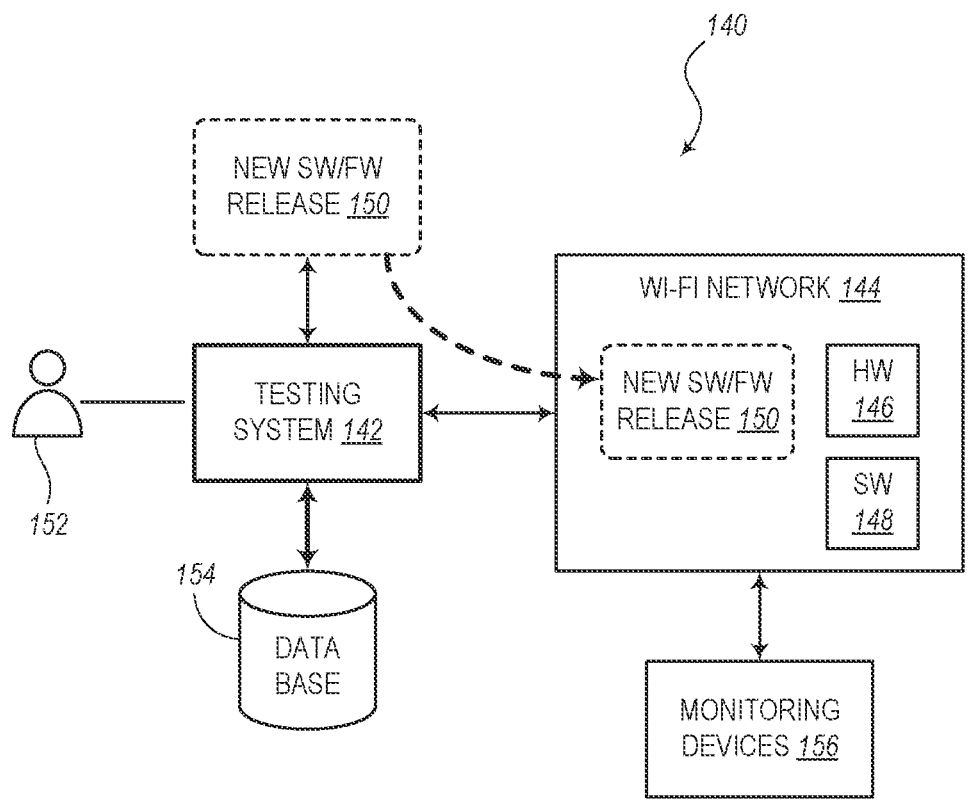
FIG. 10 is a block diagram illustrating a test setup that may be implemented in a real-world mesh Wi-Fi system and/or a simulated mesh Wi-Fi system, according to various embodiments.

FIG. 10 is a block diagram illustrating an embodiment of a test setup 140, which may be implemented in a real-world mesh Wi-Fi system (e.g., mesh Wi-Fi system 120) and/or a simulated mesh Wi-Fi system. As shown, the test setup 140 includes a testing system 142 configured in communication with a Wi-Fi network 144 (real or simulated). The Wi-Fi network 144 includes HW components 146, existing SW/FW components 148, and a proposed SW/FW release 150. The testing system 142 may be configured to allow a user 152 to develop the proposed SW/FW release 150 using any suitable SW creating techniques, Continuous Integration (CI) system, etc. and install the proposed SW/FW release 150 into the environment of the Wi-Fi network 144. The testing system 142 may have access to a database 154, which may be configured to store test parameters, test variables, test libraries, etc. for defining various types of tests that can be run in the test setup 140. The database 154 may also be configured to store information (e.g., topology data) about the HW components 146 and SW/FW components 148, communication links, HW/SW platforms and protocols, etc. of the Wi-Fi network 144.

In addition, the test setup 140 may further include one or more monitoring devices 156, which may be configured monitor various operational states and other metrics. For example, the monitoring devices 156 may be configured to monitor topology data, data traffic flow (wired and wireless traffic), link status, Internet connectivity status, status of various interfaces, wireless signal strength between HW components 146, user actions with respect to use of the SW/FW components 148, application actions of the SW/FW components 148, and actions/responses of the HW components 146. In some embodiments, the monitoring devices 156 may further include certain HW monitoring elements to measure physical properties of the HW components 146, such as temperature sensors, etc.

The testing system 142 shown in the test setup 140 of FIG. 10 may be configured to simulate end-user actions for testing the proposed SW/FW release 150. Also, the testing system 142 may be configured to perform end-to-end testing for the entire cloud based Wi-Fi network (e.g., mesh Wi-Fi system 120, Wi-Fi network 144, etc.). Furthermore, the testing system 142 may be configured to perform tests regarding any bandwidth of Wi-Fi signals, such any one or more of the 2.4 GHz band, 5 GHz band, 6 GHz band (and 6E band), 7 GHz band, and any bands used in the future.

In some embodiments, the cloud-based server 12 shown in FIG. 5 may also represent the testing system 142 shown in FIG. 10. That is, the troubleshooting program 74 shown in FIG. 5 may be configured to perform further functionality with respect to monitoring a cloud-based Wi-Fi system, such as the mesh Wi-Fi system 120, Wi-Fi network 144, etc. Thus, the troubleshooting program 74 may also include a testing program for monitoring both the HW components 146 and/or SW/FW components 148 according to implementations defined in the present disclosure.

The testing system 142 (or cloud-based server 12) may be configured as a testing framework that enables automated verification of cloud-based Wi-Fi platforms and allows reusability of test cases on different HW and SW platforms. One class of tests may be executed as end-to-end test scripts, which may be configured to validate results on multiple HW and SW platforms (e.g., gateways, extenders, cloud controllers, mobile apps, web apps, etc.). The end-to-end test scripts, for example, may include information about transactions that might be performed (e.g., by the mesh Wi-Fi system 120, Wi-Fi network 144, etc.) in order to validate the operability of the HW components 146 under test and/or the SW/FW components 148 under test and to verify that the components are behaving according to certain test criteria.

Also, the testing system 142 may be configured to obtain log information (e.g., log files, log data, etc.) from each of the components (e.g., HW components 146, SW/FW components 148, interfaces, etc.) under test and/or from the monitoring devices 156. For example, the testing system 142 may use a "logpull" procedure to pull (gather) the log information from the components, endpoint devices, etc. Also, communication between components can be fully logged. In some embodiments, the obtained (pulled) logs or data may be stored in the database 154. In some embodiments, the testing system 142 may be configured to determine whether an alert condition (e.g., fault, error, failure, threshold crossing, etc.) exists in the Wi-Fi network 144. In the case of an alert condition, the testing system 142 may be configured to gather additional logs and/or app screenshots from the monitoring devices 156 and/or web management interface. The additional logs and screenshots may be bound to a test report that the testing system 142 (or test framework) may create in response to monitoring test data and analyzing the status of the Wi-Fi network 144. Also, the screenshots, as described with respect to FIGS. 7A-7M, may be stored in a single image file and presented in a vertically-merged orientation.

As mentioned above, the testing system 142 may be configured to use simulations for testing real-world and/or proposed environments. End user actions may be simulated for testing of the mesh Wi-Fi systems. For example, the mobile apps 132 and web apps 134 may be configured to trigger actions on devices in the local Wi-Fi network 128 (e.g., SW/FW in pods) and the testing system 142 may then validate the results. The testing system 142 may conduct End-to-End (E2E) automated testing solutions for cloud-based mesh Wi-Fi platforms.

In some embodiments, certain tools (e.g., Internal tools) may be deployed within the testing framework. These tools, for example, may include:

pset: sets test environments with chosen variables
pod: communicates with DUT (e.g., residential gateway, router, extender, leaf, etc.) via Secure Shell (SSH) protocol and/or serial interfaces
client: communicates with Wi-Fi, Ethernet, and/or Bluetooth clients via SSH interfaces
cloud: communicates with cloud controller (e.g., cloud controller 122) via Application Programming Interface (API)
server: communicates with testbed server or managing unit
mobile_device: configures a mobile device that will be used for testing, uploading certificates; supports iOS and Android devices
mobile_host: enables host configuration that is responsible for communication between test script and the device under test
rpower: communicates with a Remote Managed Power Distribution Unit
switch: communicates with testbed switch
reserve: testbed reservation for a specific test run, user, or CI system
logpull: generates and/or downloads logfiles and does first quick static analysis of logs; the logs may identify root causes even when a customer executes acceptance tests The test framework of the testing system 142 may be configured to collect:

SSH communication with testbed clients and nodes
Representational State Transfer (REST) API communication with Cloud services
Data Layer communication log files
Throughput logfiles (e.g., for performance tests only)
Intercepted HTTP traffic logs, such as from communication between web/mobile apps and the Internet
Driver logs of automated tests of the mobile/web apps
Mobile application logs (logcat)
Mobile driver server logs (Appium server)

In case of alert conditions (e.g., faults, errors, etc.), the testing system 142 may obtain:

Wireless configuration (e.g., WPA_supplicant) and system (e.g., DMESG) logs from Wi-Fi/Ethernet clients
DUT logpull—mesh Wi-Fi hardware log files
XML source code of mobile application's dialog
Complete webpage source code Furthermore, GUI screenshots may include test scenario recordings presented as screenshots (e.g., FIG. 7). For example, in the case of alert conditions or failed test cases, the image quality may be higher than normal. Additionally, another screenshot may be taken as the last step of failed test cases which allows the test system 142 to identify a difference between failure and the state of the app a few seconds later.

During parallel test case executions, the tests may be dynamically assigned to a testbed based on their unique capabilities. For example, LTE related tests can be executed on LTE-enabled testbeds. Also, the test system 142 may perform load balancing, which can take into account these unique capabilities and does not necessarily use hardcoded names of the testbed.

The systems and methods for troubleshooting, monitoring, testing, validating, etc., particularly described with respect to FIGS. 9 and 10, may be representative of a test framework that generally enables the testing of both hardware components and software components associated with a local Wi-Fi network during a single test run. A test automation framework may be configured to automatically test components of a cloud-based mesh Wi-Fi network and may be implemented in a cloud-based controller. The system under test may be a mesh Wi-Fi network, multi-layered HW/SW platform, etc.

Generally, the present disclosure is directed to testing HW/SW components in a local Wi-Fi network. The local Wi-Fi network may include, for example, at least HW components (e.g., router, modem, gateway device, extenders, access points, pods, leaves, end user devices, client devices, etc.) plus SW components (e.g., mobile apps, web apps, etc.). Logging data associated with each HW/SW component may be recorded. The test system 142 may pull or obtain this log data and use it to test the HW/SW components in any combination of a real-world or simulated environment.

Figure 11:
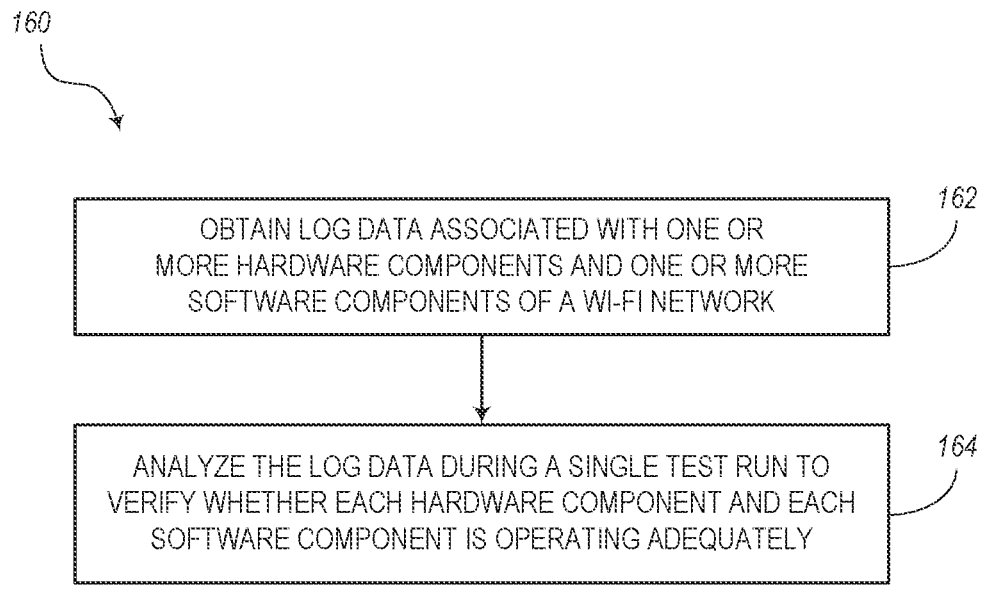
FIG. 11 is a flow diagram illustrating a method for testing hardware, software, and firmware components in a mesh Wi-Fi system, according to various embodiments.

FIG. 11 is a flow diagram illustrating an embodiment of a method 160 for testing HW and SW/FW components in a mesh Wi-Fi system. The method 160 may be performed by one or more suitable device, such as the cloud-based server 12, end user device 40, app 50, cloud controller 122, testing system 142, etc. Also, the method 160 may be related to the troubleshooting program 74 shown in FIG. 5.

As illustrated, the method 160 includes the step of obtaining log data associated with one or more hardware components and one or more software components of a Wi-Fi network, as indicated in block 162. Also, the method 160 includes the step of analyzing the log data during a single test run to verify whether each hardware component and each software component is operating adequately, as indicated in block 164.

In some embodiments, the method 160 may further include the step of utilizing an automated test framework to automatically test the one or more hardware components and one or more software components. For example, the automated test framework may utilize one testing library, one set of reusable test parameters, and/or one testbed in order to test each of the one or more hardware components and one or more software components in a modular fashion and/or in a manner that includes testing one component at a time. The method 160 may be executed by any type of testing system, which may be deployed in a cloud-based controller. The Wi-Fi network, for example, may be a mesh network having a multi-layer hardware/software platform.

Furthermore, with respect to the method 160, each of the one or more hardware components may be configured to operate according to OpenSync and may also be a router, a modem, a gateway device, a node, an extender, an access point device, a pod, a leaf device, or a client device. Also, each of the one or more software components may be a mobile app, a web app, or other type of app. The step of obtaining the log data (block 162) may include the step of remotely accessing the log data using a logpull procedure. The method 160 may also include the step of testing a proposed software/firmware release during the single test run. The step of testing the proposed software/firmware release, for example, may include using a real-world Wi-Fi environment and/or simulated Wi-Fi environment.

The single test run described in block 164 may include end-to-end analysis of the Wi-Fi network to test multiple hardware components, one or more communication links between adjacent pairs of hardware components, and the one or more software components in order to verify whether each hardware component, communication link, and software component is operating adequately. In some embodiments, the method 160 may also include the step of utilizing a test script to validate whether each hardware component and software component is performing Wi-Fi transactions in a proper manner. In response to detecting and identifying one or more deficiencies in the Wi-Fi network, the method may further include the step of gathering screenshots associated with a web management interface. In addition, the method 160 may include testing a) Internet connectivity, b) data traffic congestion, c) channel interference, and/or d) wireless signal strength.

According to some embodiments, the method 160 may utilize an automated test framework having tools to perform steps of a) setting test variables, b) communicating with a testbed via SSH interfaces, c) communicating with cloud controller via REST API, d) communicating with a testbed server, testing system, or web management interface, e) configuring a mobile device, f) enabling communication between test script and DUTs, g) communicating with a Remote Managed Power Distribution Unit, h) obtaining http traffic logs between the Wi-Fi network and the Internet, i) obtaining application driver logs, j) obtaining screenshots associated with usage of the one or more software components, k) communicating with a testbed switch, l) reserving a testbed for a specific test run or Continuous Integration (CI) system, m) generating or downloading log files, and/or n) performing an analysis of the log files. Also, the method 160 may include the steps of executing parallel testing and then dynamically assigning testbeds based on the unique capability of each testbed and based on load balancing criteria.

Therefore, according to the various implementations described herein, the system and methods of the present disclosure may include certain benefits and advantages over conventional systems. For example, the present disclosure can provide rapid identification of failures independently of root cause in both hardware and software components. the systems may be configured to access, as needed, any components, logfiles, screenshots, etc. for the duration of a whole test run, even in the case of a failed test case. It may be noted that there is no need to re-execute the same test case in the case where a defect is found. Since the present systems can gather all the necessary log information up front, there may be no need to retest components or perform multiple stages of testing.

Another advantage is that only one testbed may be needed, which can then be used for all testing types (e.g., mobile apps, web apps, firmware release versions, etc.). Thus the testing structure can have reusability that allows for a reduction in costs and time due to the usage of the same test setup. In other words, there may be no need to build and deploy new images for every test. The testing framework may use common libraries for all testing types, which can help to reduce implementation and maintenance costs. Also, for proposed software/firmware releases, this parallel testing can shortens the time-to-market for new software/firmware solutions. Parallelization of tests execution may be implemented by testbed standardization, which can enable scalability of the test environments and may help to reduce time needed for full test cycles on multiple HW and SW platforms.

Also, hardware monitoring may be performed during test execution. In some cases, physical parameters (e.g., temperature) may be measured and/or constantly monitored. In some cases, if these parameters are outside of acceptable thresholds, the physical condition may be reported (e.g., device is running too hot). This may help to identify scenarios where traffic flow can be limited and/or whether hardware/software issues exist.

Connectivity and link status information may also be monitored. For example, Internet connectivity may be monitored. In the case of an Internet access issue, the testing systems and methods may briefly pause test execution and affected steps may be repeated, as necessary. This strategy may allow an improvement in test execution stability and may avoid the impact of Internet connection issues on the test results.

In some embodiments, the testbed may be hardware-based may be connected to a number of Wi-Fi clients and Ethernet clients. The testbed may also include a configurable switch and one or more remote Power Distribution Units (PDUs), according to various test scenarios. The testbed can simulate real-life behaviors, such connections between client devices, incoming data traffic flows, etc. The testing system may check operation times, Quality of Experience (QoE) values, etc. The testbed may be configured to test any type of conditions based on known actions that a user may take or what he or she may be likely to do. In the test framework, the mobile or web apps may represent how they may be configured in the environment. The present systems and methods may test how effectively a mobile app under test is performing. In some embodiments, the proposed release may include information about connections to adjoining hardware and connection to the cloud. In the mobile app, this information can be viewed on a mobile phone, for example, and may represent the network that the client is currently connected to, the pods used for connections, etc. These steps may be part of the verification procedures.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium configured to store computer logic for enabling one or more processing devices to:
    obtain log data associated with one or more hardware components and one or more software components of a Wi-Fi network;
    analyze the log data during a single test run to verify whether each hardware component and each software component is operating adequately; and
    utilize an automated test framework to automatically troubleshoot the one or more hardware components and one or more software components; the automated test framework utilizes one testing library or set of reusable test parameters and one testbed in order to test each of the one or more hardware components and one or more software components in a modular fashion one component at a time, such that upon detection of an alert condition, the automated test framework operates to deploy a tool to fix the alert condition.

2. The non-transitory computer-readable medium of claim 1, wherein the non-transitory computer-readable medium is deployed in a cloud-based controller.

3. The non-transitory computer-readable medium of claim 1, wherein the Wi-Fi network is a mesh network having a multi-layer hardware/software platform.

4. The non-transitory computer-readable medium of claim 1, wherein each of the one or more hardware components is configured to operate according to OpenSync and is one of a router, a modem, a gateway device, a node, an extender, an access point device, a pod, a leaf device, and a client device.

5. The non-transitory computer-readable medium of claim 1, wherein each of the one or more software components is one of a mobile app and a web app.

6. The non-transitory computer-readable medium of claim 1, wherein obtaining the log data includes remotely accessing the log data using a logpull procedure.

7. The non-transitory computer-readable medium of claim 1, wherein the computer logic further enables the one or more processing devices to test a proposed software/firmware release during the single test run.

8. The non-transitory computer-readable medium of claim 7, wherein testing the proposed software/firmware release includes using one or more of a real-world Wi-Fi environment and simulated Wi-Fi environment.

9. The non-transitory computer-readable medium of claim 1, wherein the single test run includes end-to-end analysis of the Wi-Fi network to test multiple hardware components, one or more communication links between pairs of hardware components, and the one or more software components in order to verify whether each hardware component, communication link, and software component is operating adequately.

10. The non-transitory computer-readable medium of claim 1, wherein the computer logic further enables the one or more processing devices to utilize a test script to validate whether each hardware component and software component is performing Wi-Fi transactions in a proper manner.

11. The non-transitory computer-readable medium of claim 1, wherein, in response to detecting and identifying one or more deficiencies in the Wi-Fi network, the computer logic further enables the one or more processing devices to gather screenshots associated with a web management interface.

12. The non-transitory computer-readable medium of claim 1, wherein the computer logic further enables the one or more processing devices to test one or more of a) Internet connectivity, b) data traffic congestion, c) channel interference, and d) wireless signal strength.

13. The non-transitory computer-readable medium of claim 1, wherein the computer logic further enables the one or more processing devices to utilize an automated test framework having tools to perform one or more of a) setting test variables, b) communicating with a testbed via SSH interfaces, c) communicating with cloud controller via REST API, d) communicating with a testbed server, testing system, or web management interface, e) configuring a mobile device, f) enabling communication between test script and DUTs, g) communicating with a Remote Managed Power Distribution Unit, h) obtaining http traffic logs between the Wi-Fi network and the Internet, i) obtaining application driver logs, j) obtaining screenshots associated with usage of the one or more software components, k) communicating with a testbed switch, l) reserving a testbed for a specific test run or Continuous Integration (CI) system, m) generating or downloading log files, and n) performing an analysis of the log files.

14. The non-transitory computer-readable medium of claim 1, wherein the computer logic further enables the one or more processing devices to execute parallel testing and dynamically assigning testbeds based on one or more capabilities of each testbed and based on load balancing criteria.

15. A method comprising the steps of:
obtaining log data associated with one or more hardware components and one or more software components of a Wi-Fi network;
analyzing the log data during a single test run to verify whether each hardware component and each software component is operating adequately; and
utilizing an automated test framework to automatically troubleshoot the one or more hardware components and one or more software components; the automated test framework utilizes one testing library or set of reusable test parameters and one testbed in order to test each of the one or more hardware components and one or more software components in a modular fashion one component at a time, such that upon detection of an alert condition, the automated test framework operates to deploy a tool to fix the alert condition.

16. A system comprising:
a processing device; and
a memory device configured to store computer logic for enabling the processing device to:
obtain log data associated with one or more hardware components and one or more software components of a Wi-Fi network;
analyze the log data during a single test run to verify whether each hardware component and each software component is operating adequately; and
utilize an automated test framework to automatically troubleshoot the one or more hardware components and one or more software components; the automated test framework utilizes one testing library or set of reusable test parameters and one testbed in order to test each of the one or more hardware components and one or more software components in a modular fashion one component at a time, such that upon detection of an alert condition, the automated test framework operates to deploy a tool to fix the alert condition.

* * * * *